United States Patent
Murota

(10) Patent No.: US 11,415,218 B2
(45) Date of Patent: Aug. 16, 2022

(54) WORKING FLUID SUPPLY DEVICE

(71) Applicant: KYB Corporation, Tokyo (JP)

(72) Inventor: Kazuya Murota, Tokyo (JP)

(73) Assignee: KYB CORPORATION, Tokyo (JP)

(*) Notice: Subject to any disclaimer, the term of this patent is extended or adjusted under 35 U.S.C. 154(b) by 0 days.

(21) Appl. No.: 17/285,004

(22) PCT Filed: Oct. 21, 2019

(86) PCT No.: PCT/JP2019/041344
§ 371 (c)(1),
(2) Date: Apr. 13, 2021

(87) PCT Pub. No.: WO2020/090550
PCT Pub. Date: May 7, 2020

(65) Prior Publication Data
US 2021/0341054 A1   Nov. 4, 2021

(30) Foreign Application Priority Data

Nov. 1, 2018  (JP) .............................. JP2018-206459
Nov. 1, 2018  (JP) .............................. JP2018-206460

(51) Int. Cl.
*F16H 61/02*   (2006.01)
*F16H 61/12*   (2010.01)

(52) U.S. Cl.
CPC .......... *F16H 61/0202* (2013.01); *F16H 61/12* (2013.01); *F16H 2061/1288* (2013.01)

(58) Field of Classification Search
CPC ...... F16H 59/50; F16H 61/0202; F16H 61/12; F16H 61/0031; F16H 2061/1288
See application file for complete search history.

(56) References Cited

U.S. PATENT DOCUMENTS

| | | | |
|---|---|---|---|
| 4,256,439 A * | 3/1981 | Kosodo | F04B 49/007 60/486 |
| 4,347,044 A * | 8/1982 | Ahlen | F16H 61/0031 417/310 |

(Continued)

FOREIGN PATENT DOCUMENTS

| | | |
|---|---|---|
| JP | 2000-046166 A | 2/2000 |
| JP | 2003-139230 A | 5/2003 |

(Continued)

*Primary Examiner* — Edwin A Young
(74) *Attorney, Agent, or Firm* — Rabin & Berdo, P.C.

(57) ABSTRACT

A working fluid supply device is provided with: a first oil pump and a second oil pump driven by an engine; a third oil pump driven by an electric motor; a first unloading valve configured to shift the second oil pump to a no-load operation state; and a controller configured to control a supply state of working oil to an automatic transmission. The controller sets the supply state to a supply state selected from: a first supply state in which the working oil is supplied only from the first oil pump; a second supply state in which the working oil is supplied from the first oil pump and the third oil pump; a third supply state in which the working oil is supplied from the first oil pump and the second oil pump; and a fourth supply state in which the working oil is supplied from the first oil pump, the second oil pump, and the third oil pump.

16 Claims, 8 Drawing Sheets

(56) References Cited

U.S. PATENT DOCUMENTS

| | | | | |
|---|---|---|---|---|
| 5,136,846 A | * | 8/1992 | Arii | E02F 9/2292 |
| | | | | 60/494 |
| 2011/0237394 A1 | * | 9/2011 | Hirai | F16H 61/0031 |
| | | | | 477/167 |
| 2017/0321794 A1 | * | 11/2017 | Kiehlneker | F04C 2/10 |

FOREIGN PATENT DOCUMENTS

| | | | |
|---|---|---|---|
| JP | 2010-078087 A | 4/2010 | |
| JP | 2013-245789 A | 12/2013 | |

\* cited by examiner

WORKING FLUID SUPPLY DEVICE

TECHNICAL FIELD

The present invention relates to a working fluid supply device for controlling supply of working fluid to a motive force transmitting device for a vehicle.

BACKGROUND ART

JP2000-46166A discloses a working fluid supply device including a mechanical pump driven by an engine and an electric pump driven by an electric motor. In this working fluid supply device, the working fluid can be supplied from the mechanical pump and the electric pump to the motive force transmitting device.

SUMMARY OF INVENTION

With the working fluid supply device disclosed in JP2000-46166A, even if flow rate of the working fluid discharged from the mechanical pump is much greater than the flow rate of the working fluid required by the motive force transmitting device, the mechanical pump is continued to be driven by the engine. Thus, fuel is wastefully consumed in the engine, and as a result, there is a risk in that a fuel efficiency of the vehicle is deteriorated.

An object of the present invention is to improve a fuel efficiency of a vehicle.

According to one aspect of the present invention, a working fluid supply device configured to control supply of working fluid to a motive force transmitting device, the motive force transmitting device being configured to transmit output from a first driving source to a drive wheel of a vehicle, the working fluid supply device includes: a first pump and a second pump driven by the output from the first driving source, the first pump and the second pump being capable of supplying working fluid to the motive force transmitting device; a third pump driven by an output from a second driving source, the third pump being capable of supplying working fluid to the motive force transmitting device; a first unloading mechanism configured to shift the second pump to a no-load operation state; and a supply state control unit configured to control a supply state of working fluid to the motive force transmitting device in accordance with a state of the vehicle, wherein the supply state control unit is configured to set the supply state of the working fluid to the motive force transmitting device, based on the state of the vehicle, to a supply state selected from: a first supply state in which the second pump is shifted to the no-load operation state by the first unloading mechanism, the third pump is stopped, and the working fluid is supplied to the motive force transmitting device only from the first pump; a second supply state in which the second pump is shifted to the no-load operation state by the first unloading mechanism and the working fluid is supplied to the motive force transmitting device from the first pump and the third pump; a third supply state in which the third pump is stopped and the working fluid is supplied to the motive force transmitting device from the first pump and the second pump; and a fourth supply state in which the working fluid is supplied to the motive force transmitting device from the first pump, the second pump, and the third pump.

According to another aspect of the present invention, a working fluid supply device configured to control a supply of working fluid to a motive force transmitting device, the a motive force transmitting device being configured to transmit an output from a first driving source to a drive wheel of a vehicle, the working fluid supply device includes: a first pump driven by the output from the first driving source, the first pump being capable of supplying the working fluid to the motive force transmitting device; a second pump having larger discharge capacity than the first pump, the second pump being driven by the output from the first driving source, and the second pump being capable of supplying the working fluid to the motive force transmitting device; a third pump driven by an output from a second driving source, the third pump being capable of supplying the working fluid to the motive force transmitting device; a first unloading mechanism configured to shift the first pump to a no-load operation state; the second unloading mechanism configured to shift the second pump to the no-load operation state; and a supply state control unit configured to control a supply state of the working fluid to the motive force transmitting device in accordance with a state of the vehicle, wherein: the supply state control unit is configured to compute, based on the state of the vehicle, a required flow rate of the working fluid that is required by the motive force transmitting device, a discharge flow rate of the first pump and the second pump, and driving motive force of the respective pumps; the supply state control unit being configured to control the second driving source, the first unloading mechanism, and the second unloading mechanism based on a result of the computation; and the supply state control unit being configured to cause the working fluid to be supplied to the motive force transmitting device from at least any one of the first pump, the second pump, and the third pump.

DESCRIPTION OF EMBODIMENTS

Embodiments of the present invention will be described below with reference to the attached drawings.

First Embodiment

Figure 1:
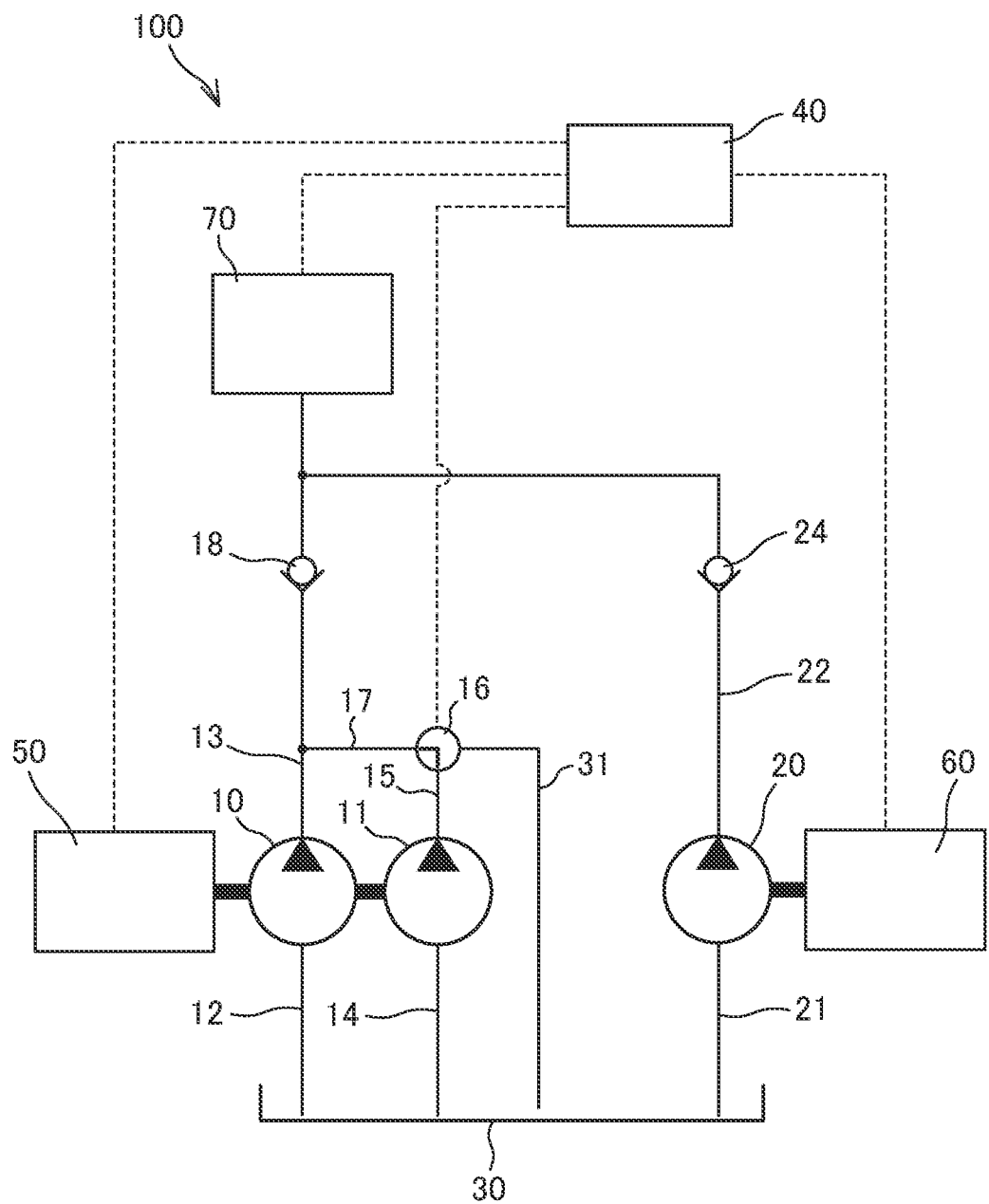
FIG. 1 is a schematic view showing a configuration of a working fluid supply device according to a first embodiment of the present invention.

A working fluid supply device 100 according to a first embodiment of the present invention will be described with reference to FIG. 1. FIG. 1 is a schematic view showing a configuration of the working fluid supply device 100.

The working fluid supply device 100 is mounted on a vehicle (not shown) including an engine 50 serving as a first driving source and an automatic transmission 70 serving as a motive force transmitting device for transmitting output from the engine 50 to a drive wheel, and the working fluid supply device 100 controls supply of working fluid to the automatic transmission 70. In the following, a description will be given of a case in which the automatic transmission 70 is a transmission provided with a belt type continuously variable transmission (CVT), as an example.

The working fluid supply device 100 is provided with: a first oil pump 10 serving as a first pump that is capable of supplying working oil serving as the working fluid to the automatic transmission 70 by being driven by the output from the engine 50; a second oil pump 11 serving as a second pump that is capable of supplying the working oil to the automatic transmission 70 by being driven, together with the first oil pump 10, by the output from the engine 50; a third oil pump 20 serving as the third pump that is capable of supplying the working oil to the automatic transmission 70 by being driven by output from an electric motor 60 serving as a second driving source; a first unloading valve 16 serving as a first unloading mechanism that shifts the second oil pump 11 to a no-load operation state; and a controller 40 serving as a supply state control unit that controls a supply state of the working oil to the automatic transmission 70 by controlling operations of the electric motor 60 and/or the first unloading valve 16.

The first oil pump 10 is a vane pump that is rotationally driven by the engine 50, and the first oil pump 10 sucks the working oil reserved in a tank 30 through a first suction pipe 12 and discharges the working oil to the automatic transmission 70 through a first discharge pipe 13.

Similarly to the first oil pump 10, the second oil pump 11 is the vane pump that is rotationally driven by the engine 50, and the second oil pump 11 sucks the working oil reserved in the tank 30 through a second suction pipe 14 and discharges the working oil through a second discharge pipe 15.

The first oil pump 10 and the second oil pump 11 may be two vane pumps configured separately or may be configured with a single vane pump such as a balanced vane pump having two suction regions and two discharge regions. In addition, a discharge flow rate from the first oil pump 10 and the discharge flow rate from the second oil pump 11 may be the same or different.

The second discharge pipe 15 is connected to the first discharge pipe 13 via the first unloading valve 16 and a connecting pipe 17. A check valve 18 is provided on the first discharge pipe 13 on the downstream side of a connection point to the connecting pipe 17. The check valve 18 only allows a flow of the working oil from the first oil pump 10 and the second oil pump 11 to the automatic transmission 70.

The first unloading valve 16 is an electrically driven switching valve that is switched between two positions, that is, a first position at which a communication between the second discharge pipe 15 and the connecting pipe 17 is allowed and a second position at which a communication between the second discharge pipe 15 and a first unloading passage 31 is allowed. The first unloading passage 31 is connected to the first unloading valve 16 at one end and is connected to the tank 30 at the other end. The position of the first unloading valve 16 is controlled by the controller 40.

When the first unloading valve 16 having the above-described configuration is switched to the first position, the first unloading passage 31 is shut off and the second discharge pipe 15 communicates with the connecting pipe 17, and so, the working oil that has been discharged from the second oil pump 11 is supplied to the automatic transmission 70. On the other hand, when the first unloading valve 16 is switched to the second position, the communication between the second discharge pipe 15 and the connecting pipe 17 is shut off and the second discharge pipe 15 communicates with the first unloading passage 31, and so, the working oil that has been discharged from the second oil pump 11 is discharged to the tank 30 through the first unloading passage 31 and is returned to the suction side of the second oil pump 11.

In other words, when the first unloading valve 16 is positioned at the second position, both of the suction side and the discharge side of the second oil pump 11 are in communication with the tank 30, and a pressure difference between the suction side and the discharge side of the second oil pump 11 is approximately zero. Therefore, the second oil pump 11 is in the no-load operation state, in other words, a state in which the load for driving the second oil pump 11 is scarcely exerted to the engine 50 is established.

By switching the positions of the first unloading valve 16 as described above, it is possible to switch the second oil pump 11 between an under-load operation state and the no-load operation state. The first unloading valve 16 may be configured such that the positions are switched by being directly driven by a solenoid, or it may be configured such that the positions are switched in accordance with presence/absence a pilot pressure acting on a valve body, and any configurations may be employed as long as the positions are switched in response to the instruction from the controller 40.

The third oil pump 20 is an internal gear pump that is rotationally driven by the electric motor 60, and sucks the working oil reserved in the tank 30 through a suction pipe 21 and discharges the working oil to the automatic transmission 70 through a discharge pipe 22 that is connected to the first discharge pipe 13 of the first oil pump 10. The discharge pipe 22 is provided with a check valve 24 that only allows the flow of the working oil from the third oil pump 20 to the automatic transmission 70.

The rotation of the electric motor 60 for driving the third oil pump 20 is controlled by the controller 40. Thus, by changing the rotation of the electric motor 60, it is possible to freely change the discharge flow rate from the third oil pump 20.

As described above, in the working fluid supply device 100, it is possible to supply the working oil from three oil pumps, that is, the first oil pump 10, the second oil pump 11, and the third oil pump 20, to the automatic transmission 70.

Figure 2:
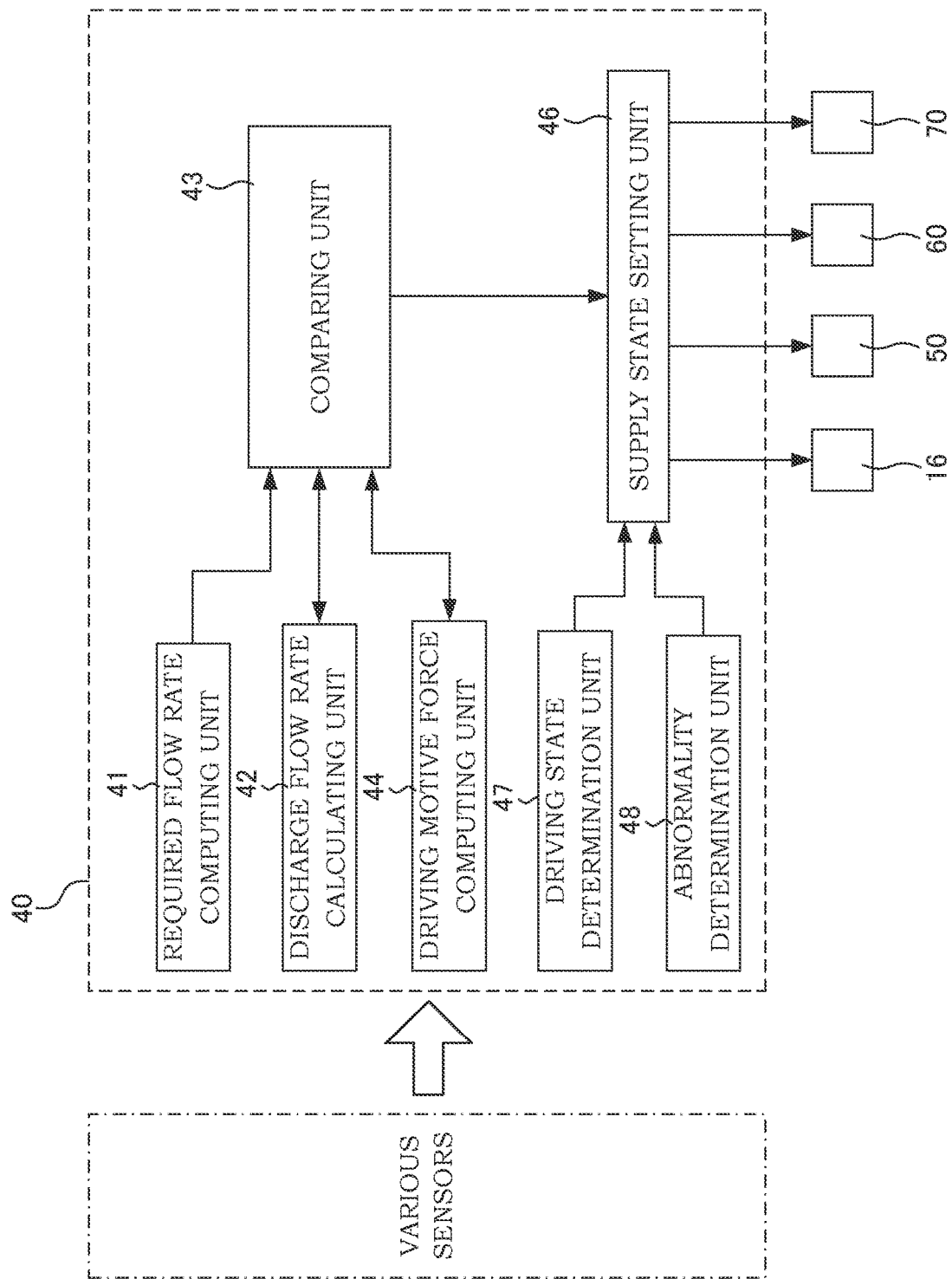
FIG. 2 is a block diagram for explaining a function of a controller of the working fluid supply device according to the first embodiment of the present invention.

Next, the controller 40 will be described with reference to FIG. 2. FIG. 2 is a block diagram for explaining a function of the controller 40.

The controller 40 is formed of a microcomputer including a CPU (a central processing unit), a ROM (a read-only memory), a RAM (a random-access memory), and an I/O interface (an input/output interface). The RAM stores data for processing executed by the CPU, the ROM pre-stores a control program, etc. for the CPU, and the I/O interface is used for input/output of information to/from a device connected to the controller 40. The controller 40 may also be formed of a plurality of microcomputers.

The controller 40 controls the supply of the working oil to the automatic transmission 70 by controlling the electric motor 60 and the first unloading valve 16 on the basis of signals indicating the state of the vehicle that are input from various sensors provided at various parts in the vehicle. The controller 40 may be configured so as to serve both as a controller of the engine 50 and a controller of the automatic transmission 70, or it may be provided separately from the controller of the engine 50 and the controller of the automatic transmission 70.

The signals indicating the state of the vehicle to be input to the controller 40 include: for example, the signals indicating the speed of the vehicle; the signals indicating acceleration of the vehicle; the signals indicating the operating position of a shift lever; the signals indicating the operated amount of the accelerator; the signals indicating the rotation speed of the engine 50; the signals indicating the load of the engine 50 such as the throttle position, the fuel-injection amount, and so forth; the signals indicating the input shaft and output shaft rotation speed of the automatic transmission 70; the signals indicating the oil temperature of the working oil in the automatic transmission 70; the signals indicating the pressure of the working oil (line pressure) supplied to the automatic transmission 70; the signals indicating the transmission gear ratio of the automatic transmission 70; the signals indicating the discharge pressure of the first oil pump 10; the signals indicating the discharge pressure of the second oil pump 11; the signals indicating the discharge pressure of the third oil pump 20; the signals indicating the rotation speed of the electric motor 60; and so forth.

The controller 40 has, as the functions for controlling the supply of the working oil to the automatic transmission 70: a required flow rate computing unit 41 that computes a required flow rate Qr of the working oil required by the automatic transmission 70 on the basis of the signals that are input from the various sensors; a discharge flow rate calculating unit 42 that calculates a first discharge flow rate Q1 of the working oil discharged from the first oil pump 10 and a second discharge flow rate Q2 of the working oil discharged from the second oil pump 11 on the basis of the signals that are input from the various sensors; a driving motive force computing unit 44 that computes a first driving motive force W1 of the first oil pump 10, a second driving motive force W2 of the second oil pump 11, and a third driving motive force W3 of the third oil pump 20 on the basis of the signals that are input from the various sensors; a comparing unit 43 that performs comparison of the flow rate that has been computed by the required flow rate computing unit 41 with the flow rate that has been calculated by the discharge flow rate calculating unit 42 and comparison between the respective driving motive force that has been computed by the driving motive force computing unit 44; and a supply state setting unit 46 that sets the supply state of the working oil to the automatic transmission 70 on the basis of a comparison result obtained by the comparing unit 43. In the above, the required flow rate computing unit 41, etc. are shown as virtual units for the respective functions of the controller 40, and they do not imply that they physically exist.

The required flow rate computing unit 41 computes the flow rate of the working oil required by the automatic transmission 70 mainly on the basis of: an accelerator opening degree and a vehicle speed; the oil temperature of the working oil in the automatic transmission 70; the pressure of the working oil supplied to the automatic transmission 70; the input shaft and output shaft rotation speed of the automatic transmission 70; and the transmission gear ratio of the automatic transmission 70.

In the above, the flow rate of the working oil required by the automatic transmission 70 includes: a transmission flow rate required for changing a width between pulleys of a variator of a belt type continuously variable transmission (not shown); a leakage flow rate through a gap in a hydraulic control valve and a gap in hydraulic circuit; a lubrication flow rate required for cooling or lubrication of the automatic transmission 70; a cooling flow rate guided to an oil cooler (not shown); and so forth.

The extent of these flow rates is mapped in advance and is stored in the ROM in the controller 40. Specifically, the transmission flow rate takes a larger value when the transmission gear ratio is changed largely, for example, at the time of acceleration at which a rate of increase of the accelerator opening degree is large and at the time of deceleration at which a rate of deceleration of the vehicle speed is large, and therefore, a rate of change the accelerator opening degree and the vehicle speed are used as the parameters for the transmission flow rate. As the parameters related to the acceleration/deceleration of the vehicle, a throttle position, a fuel-injection amount, and so forth affecting the change in the rotation speed and the load of the engine 50 may also be used. The lower the viscosity of the working oil becomes due to the increase in the temperature of the working oil and the higher the pressure of the working oil supplied becomes, the larger the value of the leakage flow rate becomes, and therefore, the temperature and pressure of the working oil are used as the parameters for the leakage flow rate.

In addition, the lower the viscosity of the working oil becomes due to the increase in the temperature of the working oil, the more likely an oil film shortage is to be caused, and therefore, the higher the temperature of the working oil is, the higher the lubrication flow rate needs to be set, and in addition, the higher a rotation speed of a rotation shaft in the automatic transmission 70 is, the more likely the oil film shortage is to be caused, and therefore, the higher the rotation speed of the rotation shaft in the automatic transmission 70 is, the higher the lubrication flow rate needs to be set. By taking these into consideration, for the lubrication flow rate, for example, the temperature of the working oil and the rotation speed of an input/output shaft of the automatic transmission 70 are used as the parameters.

In addition, from the view point of the lubricity, the retention of the oil film, and so forth, the temperature of the working oil needs to be kept so as not to exceed a predetermined temperature, and in addition, in order to cool the working oil, it is required to achieve a state in which cooling air is guided to the oil cooler, in other words, a state in which the vehicle is traveling at a predetermined vehicle speed or higher. Therefore, for the cooling flow rate, the temperature of the working oil and the vehicle speed are mainly used as the parameters. The parameters for determining the transmission flow rate, the leakage flow rate, the lubrication flow rate, and the cooling flow rate are only examples, and any parameters associated with the exemplified parameters may also be used, and so, selection of parameters is appropriately performed from with the signals input to the controller 40.

As described above, the required flow rate computing unit 41 computes the required flow rate Qr that is an amount of the working oil required by the automatic transmission 70 per unit time by taking the transmission flow rate, the leakage flow rate, the lubrication flow rate, and the cooling flow rate into consideration.

The discharge flow rate calculating unit 42 calculates the first discharge flow rate Q1 that is the amount of the working oil discharged from the first oil pump 10 per unit time mainly on the basis of the rotation speed of the engine 50 and a preset first base discharged amount D1 that is the theoretical discharged amount per revolution of the first oil pump 10. The discharge flow rate calculating unit 42 also calculates the second discharge flow rate Q2 that is the amount of the working oil discharged from the second oil pump 11 per unit time mainly on the basis of the rotation speed of the engine 50 and a preset second base discharged amount D2 that is the theoretical discharged amount per revolution of the second oil pump 11.

The rotation speed of the first oil pump 10 and the first discharge flow rate Q1 of the first oil pump 10 are in a relationship in which they are changed substantially proportional to each other, and in addition, the first discharge flow rate Q1 of the first oil pump 10 is changed in response to the viscosity that varies with the oil temperature and the discharge pressure of the first oil pump 10. These relationships are mapped in advance in order to accurately calculate the first discharge flow rate Q1 of the first oil pump 10 and are stored in the ROM of the controller 40.

Because the rotation speed of the first oil pump 10 is changed in response to the rotation speed of the engine 50 driving the first oil pump 10, the discharge flow rate calculating unit 42 easily calculates the first discharge flow rate Q1 from the rotation speed of the engine 50, the oil temperature of the working oil, and the discharge pressure of the first oil pump 10.

The first discharge flow rate Q1 may be calculated by using the rotation speed of the first oil pump 10 instead of the rotation speed of the engine 50. In addition, because the discharge pressure of the first oil pump 10 is changed in response to the line pressure that is the pressure of the working oil supplied to the automatic transmission 70, the line pressure may be used for the calculation of the first discharge flow rate Q1 of the first oil pump 10 instead of the discharge pressure of the first oil pump 10.

The second discharge flow rate Q2 of the second oil pump 11 is also calculated in a similar manner to the first discharge flow rate Q1 of the first oil pump 10. The calculation of the second discharge flow rate Q2 of the second oil pump 11 is performed regardless of the switched state of the first unloading valve 16, in other words, regardless of whether the second oil pump 11 is in the under-load operation state or the no-load operation state.

The driving motive force computing unit 44 computes the third driving motive force W3 of the third oil pump 20 for a case in which the discharge is performed at a target discharge flow rate Qa that is set on the basis of the first driving motive force W1 of the first oil pump 10, the second driving motive force W2 of the second oil pump 11, and the required flow rate Qr.

The first driving motive force W1 of the first oil pump 10 is the output expended to drive the first oil pump 10 in the engine 50 and is calculated from the first discharge flow rate Q1 of the first oil pump 10, a first discharge pressure P1, and a first pump mechanical efficiency $\eta 1$. The first pump mechanical efficiency $\eta 1$ that varies with the rotation speed of the first oil pump 10, the first discharge pressure P1, and the oil temperature of the working oil is mapped in advance and stored in the ROM of the controller 40. As the first discharge flow rate Q1, the value calculated by the discharge flow rate calculating unit 42 is used.

The second driving motive force W2 of the second oil pump 11 is also calculated in a similar manner to the first driving motive force W1 of the first oil pump 10. A second pump mechanical efficiency $\eta 2$ that varies with the rotation speed of the second oil pump 11, a second discharge pressure P2, and the oil temperature of the working oil is mapped in advance and stored in the ROM of the controller 40. In a case in which the second oil pump 11 is in the no-load operation state and the working oil is not supplied from the second oil pump 11 to the automatic transmission 70, the second driving motive force W2 of the second oil pump 11 is estimated by assuming that a line pressure PL that is the pressure of the working oil in the automatic transmission 70 is the second discharge pressure P2.

Similarly, the third driving motive force W3 of the third oil pump 20 is calculated from the target discharge flow rate Qa that is the target amount of the working oil discharged per unit time from the third oil pump 20, a third discharge pressure P3, and a third pump mechanical efficiency $\eta 3$. The target discharge flow rate Qa is set so as to have different values for a case in which the working oil is supplied to the automatic transmission 70 only from the third oil pump 20 and for a case in which the working oil is supplied to the automatic transmission 70 from the third oil pump 20 together the first oil pump 10.

Specifically, in a case in which the working oil is supplied to the automatic transmission 70 only from the third oil pump 20, it is preferable that the target discharge flow rate Qa be set to the flow rate that is higher than the required flow rate Qr by about 10%, for example, thereby allowing a margin such that the flow rate does not become lower than the required flow rate Qr even if the state of the vehicle at the present is varied by some extent. In a case in which the working oil is supplied to the automatic transmission 70 together with the first oil pump 10, it is preferable that the target discharge flow rate Qa be set to the flow rate that is higher than a deficient flow rate Qs, which is obtained by subtracting the first discharge flow rate Q1 from the required flow rate Qr, by about 10%, for example, thereby allowing a margin such that the total flow rate of the first discharge flow rate Q1 and the target discharge flow rate Qa does not become lower than the required flow rate Qr even if the state of the vehicle at the present is varied by some extent.

In a case in which the electric motor 60 is stopped and the working oil is not supplied to the automatic transmission 70 from the third oil pump 20, the third driving motive force W3 of the third oil pump 20 is estimated by assuming that the line pressure PL that is the pressure of the working oil in the automatic transmission 70 is the third discharge pressure P3. Similarly to the first pump mechanical efficiency $\eta 1$ and the second pump mechanical efficiency $\eta 2$, the third pump mechanical efficiency $\eta 3$ that varies with the rotation speed of the third oil pump 20, the third discharge pressure P3, and the oil temperature of the working oil is mapped in advance and stored in the ROM of the controller 40. Because the third driving motive force W3 of the third oil pump 20 corresponds to the electric power consumed by the electric motor 60 driving the third oil pump 20, the third driving motive force W3 of the third oil pump 20 may be calculated on the basis of the electric current and the voltage supplied to the electric motor 60.

In the above, the electric power generated by an alternator driven by the engine 50 is supplied to the electric motor 60 via a battery. Thus, in order to match the driving condition of the first oil pump 10 and the second oil pump 11 with the driving condition of the third oil pump 20, when the computation of the third driving motive force W3 of the third oil pump 20 is performed, various energy conversion efficiencies, such as the motor efficiency of the electric motor 60, the generation efficiency of the alternator, the charge/discharge efficiency of the battery, and so forth, are further taken into consideration. In other words, the finally computed third driving motive force W3 of the third oil pump 20 is the output consumed by the engine 50 when it is assumed that the third oil pump 20 is driven by the engine 50.

The methods of computing the respective driving motive force W1, W2, and W3 is not limited to the computing method described above, and any sort of computing method may be used as long as it is possible to compute the respective driving motive force W1, W2, and W3 that is required when the driving conditions of the respective oil pumps 10, 11, and 20 are set to the same condition. In addition, in a case in which the respective discharge pressures P1, P2, and P3 are not directly detected, the respective driving motive force W1, W2, and W3 may be computed by assuming the line pressure PL as the respective discharge pressures P1, P2, and P3 regardless of the supply state of the working oil.

As described below, the comparing unit 43 performs the comparison of the required flow rate Qr computed by the required flow rate computing unit 41 with the first discharge flow rate Q1 calculated by the discharge flow rate calculating unit 42 and the comparison of the total flow rate of the first discharge flow rate Q1 and the second discharge flow rate Q2 with the required flow rate Qr, and sends the signals corresponding to these comparison results to the driving motive force computing unit 44 and supply state setting unit 46. In addition, as described above, the comparing unit 43 performs the comparison of the first driving motive force W1 of the first oil pump 10 computed by the driving motive force computing unit 44 with the third driving motive force W3 of the third oil pump 20 and the comparison of the total motive force of the first driving motive force W1 and the third driving motive force W3 with the total motive force of the first driving motive force W1 and the second driving motive force W2, and sends the signals corresponding to these comparison results to the supply state setting unit 46.

The supply state setting unit 46 sets the supply state of the working oil to the automatic transmission 70 on the basis of the signals sent from the comparing unit 43. Specifically, the supply state setting unit 46 appropriately controls the first unloading valve 16, the engine 50, the electric motor 60, and the automatic transmission 70 in accordance with the signals sent from the comparing unit 43, and thereby, the supply state setting unit 46 sets the supply state among four supply states: a first supply state in which the working oil is supplied to the automatic transmission 70 only from the first oil pump 10 by shifting the second oil pump 11 to the no-load operation state by switching the first unloading valve 16 to the second position and by stopping the electric motor 60; a second supply state in which the working oil is supplied to the automatic transmission 70 from the first oil pump 10 and the third oil pump 20 by shifting the second oil pump 11 to the no-load operation state by switching the first unloading valve 16 to the second position; a third supply state in which the working oil is supplied to the automatic transmission 70 from the first oil pump 10 and the second oil pump 11 by stopping the electric motor 60; and a fourth supply state in which the working oil is supplied to the automatic transmission 70 from the three pumps, namely, the first oil pump 10, the second oil pump 11, and the third oil pump 20.

In addition to the above-described functions, the controller 40 has a driving state determination unit 47 that determines a driving state of the engine 50 on the basis of the signals that are input from the various sensors and an abnormality determination unit 48 that determines presence/absence of an abnormality in the first oil pump 10, the second oil pump 11, and the third oil pump 20 on the basis of the signals that are input from the various sensors.

The driving state determination unit 47 determines which driving states the engine 50 is in, especially, whether the engine 50 is being stopped or being driven, mainly on the basis of the rotation speed of the engine 50, the throttle position, the fuel-injection amount, and so forth. The determination result obtained by the driving state determination unit 47 is sent to the supply state setting unit 46 as a determination result signal.

When the supply state setting unit 46 receives the signal indicating that the engine 50 is in the stopped state from the driving state determination unit 47, the supply state setting unit 46 controls the electric motor 60 and sets the above-described supply state to a during-stop supply state in which the working oil can be supplied from the third oil pump 20 to the automatic transmission 70. By doing so, even when the first oil pump 10 and the second oil pump 11 are not driven by the engine 50, as in during an anti-idling, it is possible to supply the working oil to the automatic transmission 70 by the third oil pump 20.

By diverting the third oil pump 20 as an auxiliary electric oil pump that is driven during the anti-idling as described above, there is no need to separately provide the auxiliary electric oil pump, and therefore, it is possible to reduce a production cost of the vehicle. In a case in which the above-described supply state is set for the during-stop supply state, it is preferable that the second oil pump 11 be shifted to the no-load operation state by the first unloading valve 16. By shifting the second oil pump 11 to the no-load operation state, because the driving motive force of the engine 50 for driving the second oil pump 11 becomes approximately zero when the engine 50 is restarted, it is possible to improve a restarting property of the engine 50.

The abnormality determination unit 48 determines presence/absence of the abnormality in the respective oil pumps 10, 11, and 20 mainly on the basis of: the line pressure PL that is the pressure of the working oil supplied to the automatic transmission 70, the first discharge pressure P1 of the first oil pump 10, the second discharge pressure P2 of the second oil pump 11, the third discharge pressure P3 of the third oil pump 20, the temperature of the working oil, and so forth.

For example, the abnormality determination unit 48 determines that there is an abnormality in the first oil pump 10 in a case in which the line pressure PL and the first discharge pressure P1 of the first oil pump 10 fall outside a predetermined range when the first oil pump 10 is driven. The abnormality determination unit 48 also determines presence/absence of the abnormality for the second oil pump 11 and the third oil pump 20 in a similar manner.

In addition, the abnormality determination unit 48 also determines that there is an abnormality in the third oil pump 20 in a case in which the temperature of the working oil is very low and is equal to or lower than −20 degree Celsius, for example, and if the third oil pump 20 is driven by the electric motor 60, there is a risk in that the electric motor 60 becomes overloaded due to the high viscosity of the working oil. When the temperature of the working oil is very low, an anti-idling control is prohibited, and a state in which the working oil is constantly supplied to the automatic transmission 70 at least from the first oil pump 10 is established.

In addition, because there is a risk in that the electric motor 60 cannot be normally driven, the abnormality determination unit 48 also determines that there is an abnormality in the third oil pump 20 in a case in which the state of charge of the battery for supplying the electric power to the electric motor 60 is insufficient and in which there is an abnormality in the alternator for charging the generated electric power to the battery.

When the supply state setting unit 46 receives the signals indicating that there is an abnormality in the first oil pump 10 or the second oil pump 11 from the abnormality determination unit 48, the supply state setting unit 46 sets the above-described supply state to a first abnormality-time supply state in which the working oil can be supplied to the automatic transmission 70 only from the third oil pump 20, and when the supply state setting unit 46 receives the signals indicating that there is an abnormality in the third oil pump 20 from the abnormality determination unit 48, the supply state setting unit 46 sets the above-described supply state to a second abnormality-time supply state in which the working oil can be supplied to the automatic transmission 70 from the first oil pump 10 and the second oil pump 11 by switching the first unloading valve 16 to the first position.

In the first abnormality-time supply state, the supply state setting unit 46 controls the electric motor 60 to increase the rotation speed of the electric motor 60 such that the discharge flow rate of the third oil pump 20 reaches the required flow rate Qr of the working oil that is required by the automatic transmission 70.

In addition, in the second abnormality-time supply state, when the total flow rate of the first discharge flow rate Q1 of the first oil pump 10 and the second discharge flow rate Q2 of the second oil pump 11 is lower than the required flow rate Qr of the working oil that is required by the automatic transmission 70, the supply state setting unit 46 controls the automatic transmission 70 such that the rotation speed of the engine 50 is increased by slightly changing the transmission gear ratio to the low side, and thereby, the rotation speeds of the first oil pump 10 and the second oil pump 11 are increased such that the total flow rate of the first discharge flow rate Q1 and the second discharge flow rate Q2 reaches the required flow rate Qr.

In the second abnormality-time supply state, when the total flow rate of the first discharge flow rate Q1 and the second discharge flow rate Q2 is equal to or higher than the required flow rate Qr of the working oil that is required by the automatic transmission 70, the supply state setting unit 46 only executes the switching of the positions of the first unloading valve 16 without performing the control of the engine 50 and the automatic transmission 70.

By doing so, even if there is an abnormality in the respective oil pumps 10, 11, and 20, the working oil can be supplied to the automatic transmission 70 sufficiently, and so, it is possible to operate the automatic transmission 70 stably.

If the rotation speed of the engine 50 for driving the first oil pump 10 and the second oil pump 11 reaches a maximum rated rotation speed or if the rotation speed of the electric motor 60 for driving the third oil pump 20 reaches a upper-limit rotation speed, then there is a risk in that the required flow rate Qr of the working oil that is required by the automatic transmission 70 cannot be ensured. In such a case, it may be possible to reduce the required flow rate Qr of the automatic transmission 70 by reducing the output torque from the engine 50 to reduce the required line pressure PL by controlling the engine 50.

Figure 3:
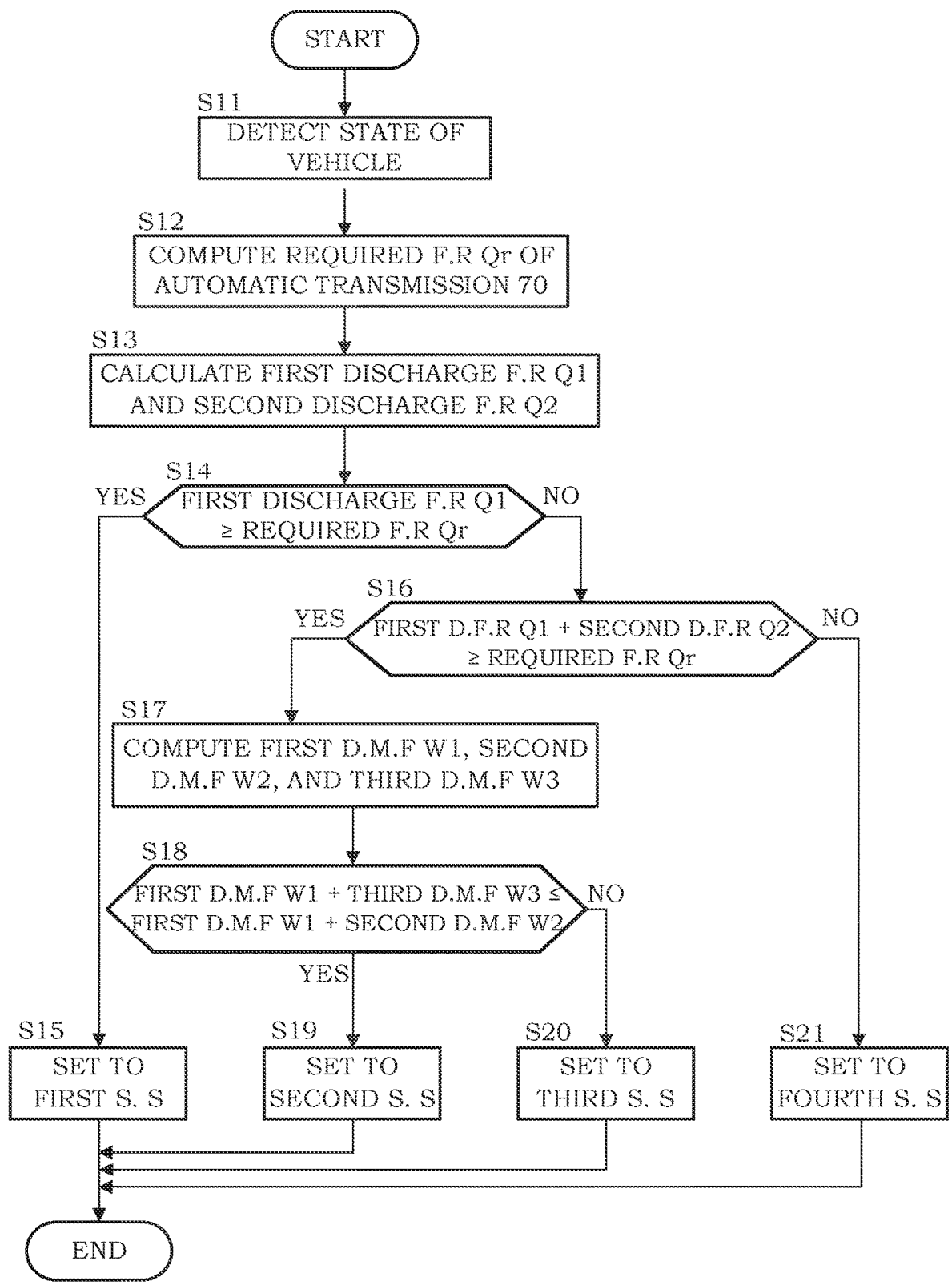
FIG. 3 is a flow chart showing a control procedure executed by the controller of the working fluid supply device according to the first embodiment of the present invention.

Next, the supply control of the working oil to the automatic transmission 70 that is performed by the controller 40 having the above-described functions will be described with reference to a flow chart in FIG. 3. The control shown in FIG. 3 is executed repeatedly at predetermined time intervals by the controller 40.

First of all, in step S11, detection signals indicating the state of the vehicle, especially the states of the engine 50 and the automatic transmission 70, are input to the controller 40 from the various sensors.

In step S12, on the basis of the signals from the various sensors that are input in step S11, the required flow rate Qr of the working oil that is required by the automatic transmission 70 is computed by the required flow rate computing unit 41.

In following step S13, on the basis of the signals from the various sensors that are input in step S11, the first discharge flow rate Q1 of the working oil discharged from the first oil pump 10 and the second discharge flow rate Q2 of the working oil discharged from the second oil pump 11 are calculated by the discharge flow rate calculating unit 42. In a case in which the specification of the first oil pump 10 and the specification of the second oil pump 11 are identical to each other, and the first discharge flow rate Q1 and the second discharge flow rate Q2 are the same value, it suffices to calculate either one of them.

The required flow rate Qr that is computed in step S12 and the first discharge flow rate Q1 that is calculated in step S13 are compared by the comparing unit 43 in step S14.

In step S14, when it is determined that the first discharge flow rate Q1 is equal to or higher than the required flow rate Qr, in other words, when it is possible to cover the required flow rate Qr of the working oil that is required by the automatic transmission 70 only by the first oil pump 10, the process proceeds to step S15.

In step S15, the supply state of the working oil to the automatic transmission 70 is set to the first supply state by the supply state setting unit 46. In this case, because the required flow rate Qr of the working oil that is required by the automatic transmission 70 is relatively low, it is possible to cover the required flow rate Qr only by driving the first oil pump 10.

Specifically, such a situation includes: a case in which the vehicle is in the steady travelling time at which a sudden acceleration and a sudden deceleration are not performed and in which there is almost no increase/decrease in the transmission flow rate; a case in which the leakage flow rate is relatively low because the oil temperature of the working oil is at or lower than 120° C., for example; a case in which the cooling flow rate is not required to be ensured because the oil temperature of the working oil is low to medium temperature; and so forth. In other words, the first base discharged amount D1 that is the theoretical discharged amount per revolution of the first oil pump 10 is set to the minimum necessary value in accordance with the operating condition with relatively low required flow rate Qr as in the steady travelling time. As described above, by reducing the first base discharged amount D1 of the first oil pump 10, the driving force of the first oil pump 10 can be reduced, and therefore, it is possible to reduce the fuel consumption of the engine 50 driving the first oil pump 10. As a result, it is possible to improve the fuel efficiency of the vehicle at the steady travelling time.

On the other hand, in step S14, when it is determined that the first discharge flow rate Q1 is lower than the required flow rate Qr, in other words, when the required flow rate Qr of the working oil that is required by the automatic transmission 70 cannot be covered only by the first oil pump 10, the process proceeds to step S16.

In step S16, the required flow rate Qr that is computed in step S12 and the total flow rate of the first discharge flow rate Q1 and the second discharge flow rate Q2 calculated in step S13 are compared by the comparing unit 43.

In step S16, when it is determined that the total flow rate of the first discharge flow rate Q1 and the second discharge flow rate Q2 is equal to or higher than the required flow rate Qr, in other words, when the required flow rate Qr of the working oil that is required by the automatic transmission 70 can be covered by the first oil pump 10 and the second oil pump 11, the process proceeds to step S17.

In step S17, on the basis of the signals from the various sensors that are input in step S11, the first driving motive force W1 of the first oil pump 10, the second driving motive force W2 of the second oil pump 11, and the third driving motive force W3 of the third oil pump 20 are computed by the driving motive force computing unit 44.

The total motive force of the first driving motive force W1 and the third driving motive force W3 that are computed by the driving motive force computing unit 44 is compared with the total motive force of the first driving motive force W1 and the second driving motive force W2 that are computed by the driving motive force computing unit 44 by the comparing unit 43 in step S18.

In the above, when the required flow rate Qr is slightly higher than the first discharge flow rate Q1, if the second oil pump 11 is driven in addition to the first oil pump 10, the amount of the working oil supplied to the automatic transmission 70 becomes excessive, and as a result, the output from the engine 50 will be wastefully consumed.

In such a case, rather than driving the second oil pump 11 in addition to the first oil pump 10, there is a better possibility to suppress the fuel consumption in the engine 50 if the deficient flow rate Qs that is obtained by subtracting the first discharge flow rate Q1 from the required flow rate Qr is discharged from the third oil pump 20 driven by the electric motor 60.

In other words, in step S18, it is determined in which of the cases: a case in which the working oil is supplied by driving the first oil pump 10 and the second oil pump 11 and a case in which the working oil is supplied by driving the first oil pump 10 and the third oil pump 20, the fuel consumption of the engine 50 can be better reduced.

In step S18, when it is determined that the total motive force of the first driving motive force W1 and the third driving motive force W3 is equal to or smaller than the total motive force of the first driving motive force W1 and the second driving motive force W2, in other words, when the fuel consumption of the engine 50 can be better reduced by supplying the working oil by driving the first oil pump 10 by the engine 50 and by driving the third oil pump 20 by the electric motor 60, the process proceeds to step S19, and the supply state of the working oil to the automatic transmission 70 is set to the second supply state by the supply state setting unit 46.

On the other hand, in step S18, when it is determined that the total motive force of the first driving motive force W1 and the third driving motive force W3 is larger than the total motive force of the first driving motive force W1 and the second driving motive force W2, in other words, when the fuel consumption of the engine 50 can be better reduced by supplying the working oil by driving the first oil pump 10 and the second oil pump 11 by the engine 50, the process proceeds to step S20, and the supply state of the working oil to the automatic transmission 70 is set to the third supply state by the supply state setting unit 46.

In the above, even in a travelling state with acceleration/deceleration, the amount of the working oil that is required by the automatic transmission 70 varies depending on degree of acceleration/deceleration. Thus, for example, the supply state of the working oil to the automatic transmission 70 is set to the second supply state when the rate of change of the vehicle speed is equal to or lower than a predetermined value and the required flow rate Qr is relatively low, and the supply state is set to the third supply state when the rate of change of the vehicle speed is higher than the predetermined value and the required flow rate Qr is relatively high. In addition, when the temperature of the working oil is low, because the viscosity of the working oil is increased, if the working oil is to be supplied by the third oil pump 20, the load exerted to the electric motor 60 is increased. Thus, the supply state of the working oil to the automatic transmission 70 is switched between the second supply state and the third supply state depending on the temperature of the working oil, for example.

As described above, the supply state of the working oil to the automatic transmission 70 is switched to an appropriate supply state in which the fuel consumption of the engine 50 can be reduced in the operation state in which the required flow rate Qr is relatively high. As a result, even at the time of travelling with acceleration/deceleration in which the required flow rate Qr is relatively increased, it is possible to improve the fuel efficiency of the vehicle.

On the other hand, in step S16, when it is determined that the total flow rate of the first discharge flow rate Q1 and the second discharge flow rate Q2 is lower than the required flow rate Qr, in other words, when the required flow rate Qr of the working oil required by the automatic transmission 70 cannot be covered by the first oil pump 10 and the second oil pump 11, the process proceeds to step S21.

In step S21, the supply state of the working oil to the automatic transmission 70 is set to the fourth supply state by the supply state setting unit 46. In this case, the required flow rate Qr of the working oil that is required by the automatic transmission 70 is relatively high, and in order to ensure the flow rate, the third oil pump 20 is driven in addition to the first oil pump 10 and the second oil pump 11.

Specifically, such a situation includes: a case in which the transmission flow rate is increased by the sudden acceleration and/or the sudden deceleration; a case in which the leakage flow rate is increased as the oil temperature of the working oil becomes a high temperature exceeding 130° C., for example; a case in which sufficient cooling flow rate needs to be ensured because the oil temperature of the working oil is high temperature and the vehicle speed is increased to the speed equal to or higher than medium speed (30 to 50 km/h); and so forth.

As described above, by appropriately switching the supply state of the working oil to the automatic transmission 70 on the basis of the state of the vehicle, the state of the engine 50 and the automatic transmission 70 in particular, the working oil is sufficiently supplied to the automatic transmission 70 and the wasteful consumption of the fuel in the engine 50 is suppressed. As a result, it is possible to stably operate the automatic transmission 70 and to improve the fuel efficiency of the vehicle.

If the supply state of the working oil to the automatic transmission 70 is switched frequently, the pressure of the working oil supplied to the automatic transmission 70 is varied and the control of the automatic transmission 70 may become unstable, and so, hysteresis may be set when the comparison is performed by the comparing unit 43 so as to suppress frequent switching of the supply state. In addition, if the amount of the working oil supplied to the automatic transmission 70 does not become lower than the required flow rate Qr after the setting has been done to any of supply states, the shift to other supply state may be prohibited for a predetermined period of time.

In addition, when the anti-idling control is performed in order to reduce the fuel consumption of the engine 50, if it is determined that the engine 50 is in the stopped state by the driving state determination unit 47, the supply state of the working oil to the automatic transmission 70 is set by the supply state setting unit 46 to the during-stop supply state in which the working oil is supplied to the automatic transmission 70 only from the third oil pump 20 without following the flow chart shown in FIG. 3.

By doing so, even when the engine 50 is stopped and the first oil pump 10 and the second oil pump 11 are not being driven, it is possible to stably supply the working oil to the automatic transmission 70 by the third oil pump 20. Because the required flow rate Qr of the working oil that is required by the automatic transmission 70 is very low when the anti-idling control is performed, it can be sufficiently covered by the third oil pump 20.

As described above, because the third oil pump 20 can be diverted as the auxiliary electric oil pump that is driven at the time of anti-idling, there is no need to provide separate auxiliary electric oil pump, and so, it is possible to reduce the production cost of the vehicle. For a case in which the vehicle is already provided with the auxiliary electric oil pump, by making the auxiliary electric oil pump to have the same function as that of the third oil pump 20, there will be no need to provide a new electric oil pump, and as a result, it is possible to reduce the production cost of the vehicle.

In addition, when it is determined by the abnormality determination unit 48 that there is an abnormality in the respective oil pumps 10, 11, and 2, the controller 40 sets the state in which the working oil is supplied to the automatic transmission 70 from the oil pump without abnormality without following the flow chart shown in FIG. 3.

Specifically, when the supply state setting unit 46 receives the signal indicating that there is an abnormality in the first oil pump 10 or the second oil pump 11 from the abnormality determination unit 48, the supply state setting unit 46 sets the supply state for supplying the working oil to the automatic transmission 70 to the first abnormality-time supply state in which the working oil is supplied only from the third oil pump 20, and the supply state setting unit 46 controls the electric motor 60 to increase the rotation speed of the electric motor 60 such that the discharge flow rate of the third oil pump 20 reaches the required flow rate Qr of the working oil that is required by the automatic transmission 70.

In addition, when the supply state setting unit 46 receives the signal indicating that there is an abnormality in the third oil pump 20 from the abnormality determination unit 48, the supply state setting unit 46 sets the supply state for supplying the working oil to the automatic transmission 70 to the second abnormality-time supply state in which the working oil is supplied from the first oil pump 10 and the second oil pump 11 by switching the first unloading valve 16 to the first position, and the supply state setting unit 46 controls the engine 50 to increase the rotation speed of the engine 50 such that the total flow rate of the first discharge flow rate Q1 of the first oil pump 10 and the second discharge flow rate Q2 of the second oil pump 11 reaches the required flow rate Qr of the working oil that is required by the automatic transmission 70.

By doing so, even if there is an abnormality in the respective oil pumps 10, 11, and 20, it is possible to sufficiently supply the working oil to the automatic transmission 70 and to stably operate the automatic transmission 70.

According to the first embodiment described above, advantages shown below can be afforded.

With the working fluid supply device 100, it is possible to shift the second oil pump 11 among the first oil pump 10 and the second oil pump 11 driven by the output from the engine 50 driving the drive wheel of the vehicle to the no-load operation state by the first unloading valve 16. Thus, when it is not necessary to drive the two oil pumps 10 and 11, wasteful consumption of the fuel by the engine 50 is suppressed by shifting the second oil pump 11 to the no-load operation state.

Furthermore, with the working fluid supply device 100, it is possible to supply the working oil to the automatic transmission 70 also from the third oil pump 20 that is driven by the electric motor 60 in addition to the first oil pump 10 and the second oil pump 11. Thus, even when the required flow rate Qr is relatively high, by selecting a combination of oil pumps for supplying the working oil to the automatic transmission 70 such that the total of the driving motive force of the oil pumps becomes relatively small, it is possible to suppress the wasteful consumption of the fuel in the engine 50.

In addition, because the working oil is also supplied from the third oil pump 20, there is no need to set maximum discharge flow rate of the first oil pump 10 and the second oil pump 11 so as to correspond to the maximum required flow rate of the automatic transmission 70, and so, it is possible to set the maximum discharge flow rate of the first oil pump 10 and the second oil pump 11 so as to be small and to reduce the driving motive force of the first oil pump 10 and the second oil pump 11. As described above, as the driving motive force of the first oil pump 10 and the second oil pump 11 is reduced, the wasteful consumption of the fuel in the engine 50 that drives the first oil pump 10 and the second oil pump 11 is suppressed. As a result, it is possible to improve the fuel efficiency of the vehicle.

Second Embodiment

Figure 4:
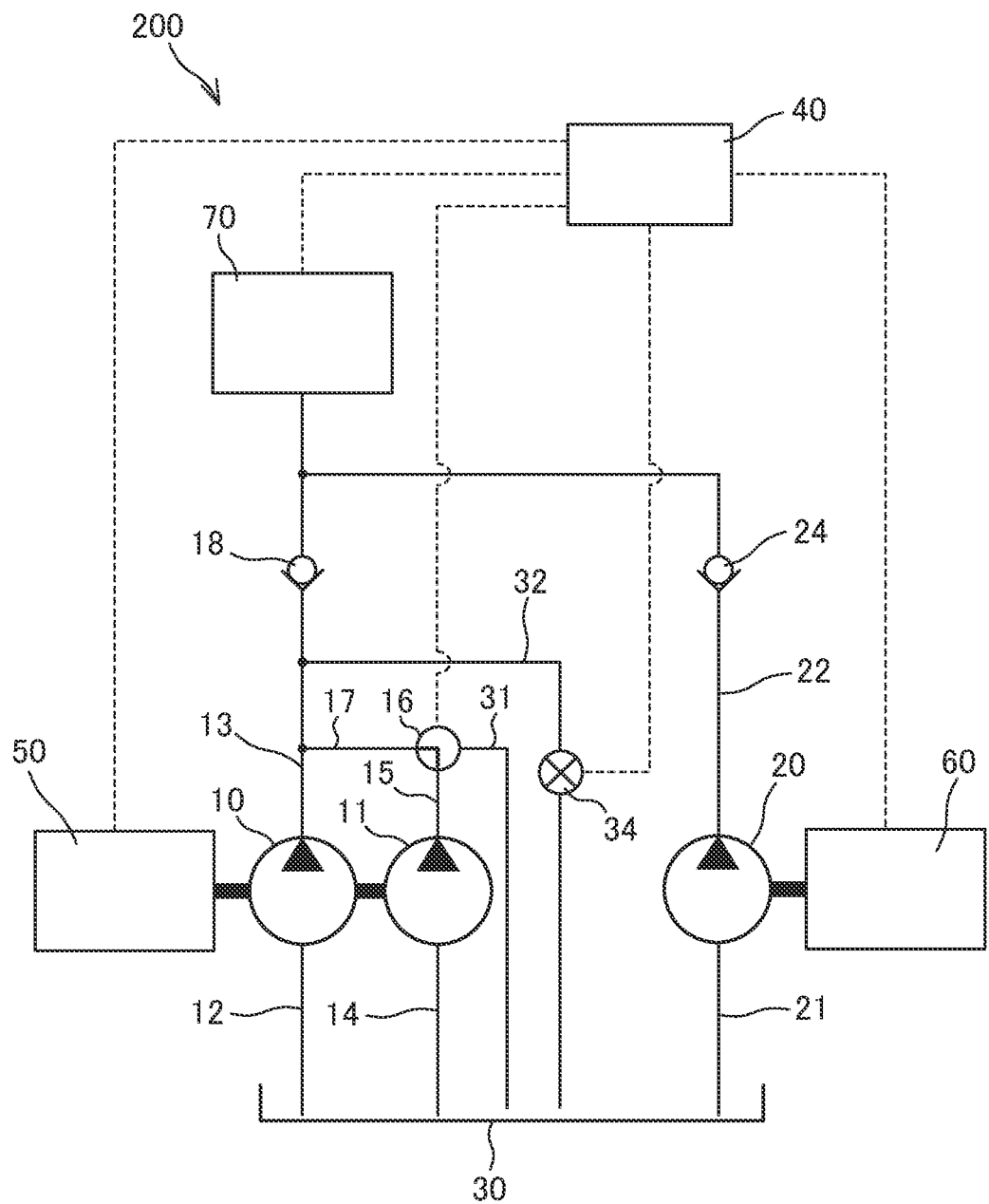
FIG. 4 is a schematic view showing the configuration of the working fluid supply device according to a second embodiment of the present invention.

Next, a working fluid supply device 200 according to a second embodiment of the present invention will be described with reference to FIG. 4. In the following, differences from the first embodiment will be mainly described, and components that are the same as those in the first embodiment are assigned the same reference numerals and descriptions thereof will be omitted.

Basic configurations of the working fluid supply device 200 are the same as those of the working fluid supply device 100 according to the first embodiment. The working fluid supply device 200 differs from the working fluid supply device 100 in that the working fluid supply device 200 is provided with a second unloading valve 34 serving as a second unloading mechanism that shifts the first oil pump 10 and the second oil pump 11 to the no-load operation state.

The first discharge pipe 13 of the working fluid supply device 200 is connected with a second unloading passage 32 through which the upstream side of the check valve 18 and the tank 30 are communicated. The second unloading valve 34 capable of releasing and shutting off the second unloading passage 32 is provided on the second unloading passage 32.

The second unloading valve 34 is an electrically driven open/close valve and is controlled by the controller 40 so as to be opened/closed. When the second unloading valve 34 is closed, because the second unloading passage 32 is shut off, the working oil that has been discharged from the first oil pump 10 and the second oil pump 11 is supplied to the automatic transmission 70 through the first discharge pipe 13.

On the other hand, when the second unloading valve 34 is opened, because the second unloading passage 32 is released, the working oil that has been discharged from the first oil pump 10 and the second oil pump 11 is discharged to the tank 30 through the second unloading passage 32 and returns to the suction side of the first oil pump 10 and the second oil pump 11.

In other words, when the second unloading valve 34 is opened, both of the suction side and the discharge side of the first oil pump 10 and the second oil pump 11 are in communication with the tank 30, and so, the pressure difference between the suction side and the discharge side of the first oil pump 10 and the second oil pump 11 becomes approximately zero.

Thus, the first oil pump 10 and the second oil pump 11 are in the no-load operation state, in other words, the load for driving the first oil pump 10 and the second oil pump 11 is scarcely exerted to the engine 50.

By switching the opening and closing of the second unloading valve 34 as described above, it is possible to switch the first oil pump 10 and the second oil pump 11 between the under-load operation state and the no-load operation state. The second unloading valve 34 may open and close the second unloading passage 32 by being directly driven by the solenoid and may open and close the second unloading passage 32 by presence/absence of the pilot pressure acting on the valve body, and the second unloading valve 34 may take any configuration as long as the second unloading passage 32 can be opened and closed in response to the instruction from the controller 40.

In the controller 40 of the working fluid supply device 200, only a control of opening and closing the second unloading valve 34 is additionally provided for the controller 40 of the working fluid supply device 100 according to the above-described first embodiment.

Thus, by appropriately controlling the second unloading valve 34 in addition to the first unloading valve 16, the engine 50, the electric motor 60, and the automatic transmission 70 in accordance with the signals sent from the comparing unit 43, the supply state setting unit 46 of the controller 40 can set the supply state from five supply states, namely, the above-described first to fourth supply states and a fifth supply state, in which the working oil is supplied to the automatic transmission 70 only from the third oil pump 20 by shifting the first oil pump 10 and the second oil pump 11 to the no-load operation state by opening the second unloading valve 34. Because other functions of the controller 40 are the same as those of the controller 40 of the working fluid supply device 100 according to the above-described first embodiment, detailed descriptions thereof will be omitted.

Figure 5:
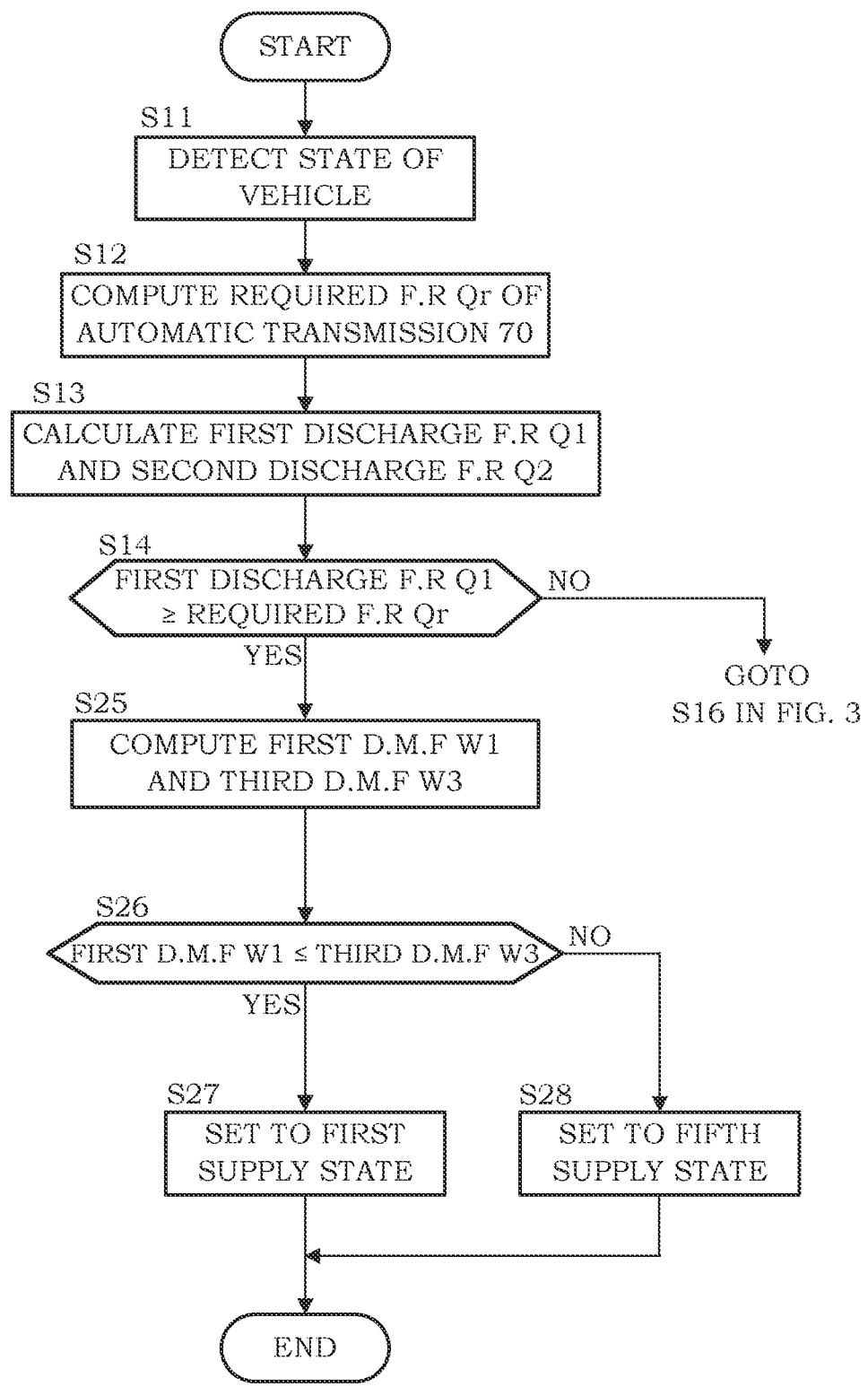
FIG. 5 is a flow chart showing the control procedure executed by the controller of the working fluid supply device according to the second embodiment of the present invention.

Next, the supply control of the working oil to the automatic transmission 70 performed by the controller 40 will be described with reference to the flow chart shown in FIG. 5. The control shown in FIG. 5 is executed repeatedly at predetermined time intervals by the controller 40.

Because steps S11 to S14 are the same as the supply control of the working oil performed by the working fluid supply device 100 according to the above-described first embodiment shown in FIG. 3, detailed descriptions thereof will be omitted.

In step S14, when it is determined that the first discharge flow rate Q1 is equal to or higher than the required flow rate Qr, in other words, when the required flow rate Qr of the working oil that is required by the automatic transmission 70 can be covered only the first oil pump 10, the process proceeds to step S25. On the other hand, in step S14, when it is determined that the first discharge flow rate Q1 is lower than the required flow rate Qr, in other words, when the required flow rate Qr of the working oil that is required by the automatic transmission 70 cannot be covered only by the first oil pump 10, the process proceeds to step S16. Because the process after step S16 is the same as the supply control of the working oil performed by the working fluid supply device 100 according to the above-described first embodiment shown in FIG. 3, detailed descriptions thereof will be omitted.

In step S25, on the basis of the signals from the various sensors that are input in step S11, the first driving motive force W1 of the first oil pump 10 and the third driving motive force W3 of the third oil pump 20 are computed by the driving motive force computing unit 44. The target discharge flow rate Qa of the third oil pump 20 that is used for the computation of the third driving motive force W3 in this case is the target discharge flow rate Qa in a case in which the working oil is supplied to the automatic transmission 70 only from the third oil pump 20. Thus, the target discharge flow rate Qa is set to the flow rate that is higher than the required flow rate Qr computed by the required flow rate computing unit 41 by about 10%, for example, thereby allowing a margin such that the flow rate does not become lower than the required flow rate Qr even if the state of the vehicle at the present is varied by some extent.

The first driving motive force W1 and the third driving motive force W3 computed by the driving motive force computing unit 44 are compared by the comparing unit 43 in step S26.

In the above, because the first oil pump 10 is driven by the engine 50, as the rotation speed of the engine 50 is increased, the discharge flow rate Q1 thereof is increased. On the other hand, although the required flow rate Qr of the working oil that is required by the automatic transmission 70 is increased when the transmission gear ratio is varied greatly, in other words, at the time of acceleration at which the rate of increase of the accelerator opening degree is large and at the time of deceleration at which the rate of deceleration of the vehicle speed is large, the required flow rate Qr becomes relatively low when the variation of the vehicle speed is small.

In other words, when the rotation speed of the engine 50 is relatively high and the vehicle speed is relatively stable, the first discharge flow rate Q1 becomes higher than the required flow rate Qr and the amount of the working oil supplied to the automatic transmission 70 becomes excessive, and as a result, the output from the engine 50 is wastefully consumed to drive the first oil pump 10. In such a case, rather than driving the first oil pump 10, there is a better possibility to suppress the fuel consumption in the engine 50 if the target discharge flow rate Qa that is higher than the required flow rate Qr by a predetermined amount is discharged from the third oil pump 20.

Specifically, such a situation includes: a case in which the rotation of the engine 50 is at or higher than the medium rotation speed range in which the rotation speed is relatively high and the vehicle is at the cruising operation state in which the variation of the vehicle speed is small; a case in which the engine 50 is rotated at the high rotation speed range by the engine brake; and so forth. In addition, even if the rotation speed of the engine 50 is low, when the vehicle is stopped and the engine 50 is in an idling operation state or when the vehicle is travelling by a creeping, because the required flow rate Qr of the automatic transmission 70 is very low, the first discharge flow rate Q1 of the first oil pump 10 may exceed the required flow rate Qr. If the oil temperature is high even in such situations, because the leakage flow rate and the cooling flow rate are increased, the first discharge flow rate Q1 of the first oil pump 10 may not necessarily exceed the required flow rate Qr.

In other words, in step S26, it is determined in which of the cases: a case in which the working oil is supplied by driving the first oil pump 10 and a case in which the working oil is supplied by driving the third oil pump 20, the fuel consumption of the engine 50 can be better reduced.

In step S26, when it is determined that the first driving motive force W1 of the first oil pump 10 is equal to or smaller than the third driving motive force W3 of the third oil pump 20, in other words, when the fuel consumption of the engine 50 can be better reduced by supplying the working oil by driving the first oil pump 10 by the engine 50, the process proceeds to step S27, and the supply state of the working oil to the automatic transmission 70 is set to the first supply state by the supply state setting unit 46.

On the other hand, in step S26, when it is determined that the first driving motive force W1 of the first oil pump 10 is larger than the third driving motive force W3 of the third oil pump 20, in other words, when the fuel consumption of the engine 50 can be better reduced by supplying the working oil by driving the third oil pump 20 by the electric motor 60, the process proceeds to step S28, and the supply state of the working oil to the automatic transmission 70 is set to the fifth supply state by the supply state setting unit 46.

As described above, by switching the supply state of the working oil to the automatic transmission 70 on the basis of the state of the vehicle, the state of the engine 50 and the automatic transmission 70 in particular, the working oil is sufficiently supplied to the automatic transmission 70 and the wasteful consumption of the fuel in the engine 50 is suppressed. As a result, it is possible to stably operate the automatic transmission 70 and to improve the fuel efficiency of the vehicle.

According to the second embodiment described above, advantages shown below can be afforded.

With the working fluid supply device 200, it is possible to shift the first oil pump 10 and the second oil pump 11 driven by the output from the engine 50 driving the drive wheel of the vehicle to the no-load operation state by the second unloading valve 34. Thus, when it is not necessary to drive the first oil pump 10 and the second oil pump 11, by shifting the first oil pump 10 and the second oil pump 11 to the no-load operation state by the second unloading valve 34, wasteful consumption of the fuel by the engine 50 is suppressed. As a result, it is possible to improve the fuel efficiency of the vehicle.

Next, modifications of the respective embodiments described above will be described.

In the respective embodiments described above, the first unloading valve 16 and the second unloading valve 34 are used as the unloading mechanism that shifts the first oil pump 10 and the second oil pump 11 to the no-load operation state. Instead of this configuration, the unloading mechanism may be a clutch that is provided at a linking portion that links the engine 50 with the respective oil pumps 10 and 11. In this case, by disengaging the clutch, the respective oil pumps 10 and 11 are not driven by the engine 50, and the discharged amount from the respective oil pumps 10 and 11 becomes zero. As described above, the no-load operation state also includes a case in which the oil pump that is normally driven by the engine 50 is shifted to the non-operated state, in other words, a state at which the load for driving the oil pump is scarcely exerted to the engine 50 is established, and thereby, the discharged amount from the oil pump becomes zero.

In addition, a variable displacement vane pump or a piston pump may be employed as the first oil pump 10 and the second oil pump 11, and the discharged amount from the first oil pump 10 and the second oil pump 11 may be caused to become zero by adjusting an eccentric amount of a cam ring or a stroke of a piston. In this case, an adjusting mechanism for adjusting the discharged amount from the variable displacement pump corresponds to the unloading mechanism, and the first oil pump 10 and the second oil pump 11 are shifted to the no-load operation state by controlling the adjusting mechanism such that the discharged amount from the first oil pump 10 and the second oil pump 11 becomes zero.

In addition, although a case in which the automatic transmission 70 is a transmission provided with the belt type continuously variable transmission (CVT) has been described in the respective embodiments described above, the automatic transmission 70 may be of any type as long as it is operated by utilizing the pressure of the working oil, and the automatic transmission 70 may be provided with a toroidal continuously variable transmission or a planetary gear mechanism.

In addition, in the respective embodiments described above, the first oil pump 10 and the second oil pump 11 are the vane pumps, and the third oil pump 20 is the internal gear pump. The types of these pumps may not necessarily be of different types, and the pumps having the same type may be used. For example, all pumps may be the vane pumps. In addition, the types of the pumps are not limited thereto, and for example, the pumps of any type may be used as long as they are displacement pumps such as external gear pumps and piston pumps. In addition, although the first oil pump 10 and the second oil pump 11 are of fixed displacement type, a pump of a variable displacement type may also be used.

In addition, in the respective embodiments described above, the first oil pump 10 and the second oil pump 11 are driven by the output from the engine 50. The first driving source driving the first oil pump 10 and the second oil pump 11 is not limited to the engine 50, and for example, the first driving source may be an electric motor that drives the drive wheel of the vehicle.

In addition, in the respective embodiments described above, the third oil pump 20 is driven by the output from the electric motor 60. The second driving source driving the third oil pump 20 is not limited to the electric motor 60, and for example, the second driving source may be an auxiliary engine that drives an auxiliary device, etc.

In addition, in the respective embodiments described above, although the various signals are listed as the signals indicating the state of the vehicle to be input to the controller 40, in a case in which a torque converter is provided in the automatic transmission 70, for example, the signals indicating an operated state and an engaged state of the torque converter may be input to the controller 40 additionally. In this case, the required flow rate Qr of the automatic transmission 70 may be computed or the switching of the supply state of the working oil to the automatic transmission 70 may be limited by taking the state of the torque converter into consideration. For example, when it is detected that the torque converter is in a semi-engaged state (a slip lock up state), the shifting of the working oil the supply state to other supply state may be prohibited. By doing so, it is possible to maintain the torque converter in a stable operated state. In addition, the signals indicating an operated amount and an operated speed of the brake may be input to the controller 40 as the signals indicating the deceleration state of the vehicle.

In addition, in the respective embodiments described above, in the discharge flow rate calculating unit 42 of the controller 40, the first discharge flow rate Q1 of the working oil discharged from the first oil pump 10 and the second discharge flow rate Q2 of the working oil discharged from the second oil pump 11 are calculated. Instead of this configuration, the actual discharge flow rate of the working oil discharged from the first oil pump 10 and the second oil pump 11 may be measured by a flow rate sensor, etc. directly.

Third Embodiment

Next, a working fluid supply device 300 according to third embodiment of the present invention will be described with reference to FIGS. 6 to 8.

Figure 6:
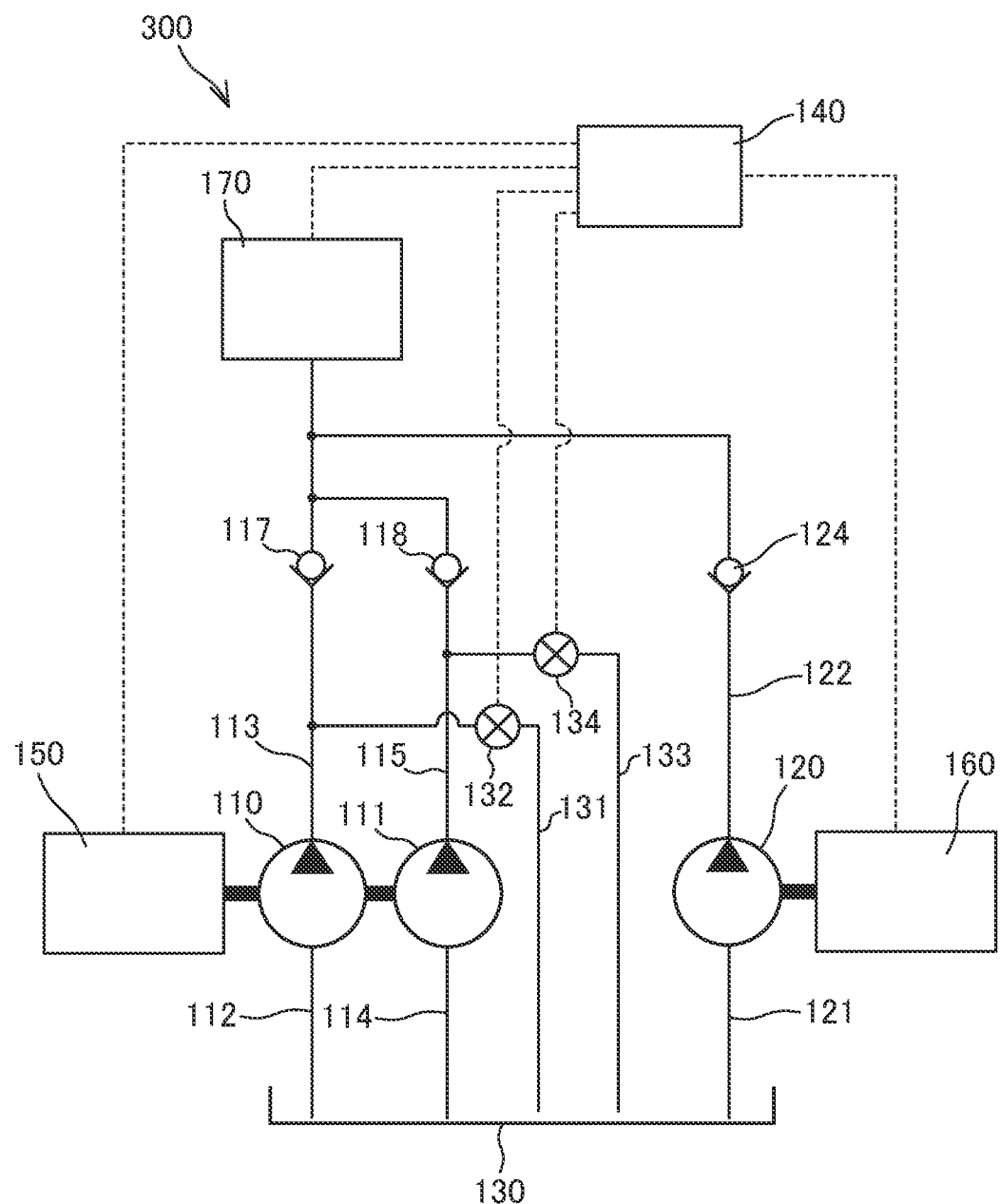
FIG. 6 is a schematic view showing the configuration of the working fluid supply device according to a third embodiment of the present invention.
Figure 7:
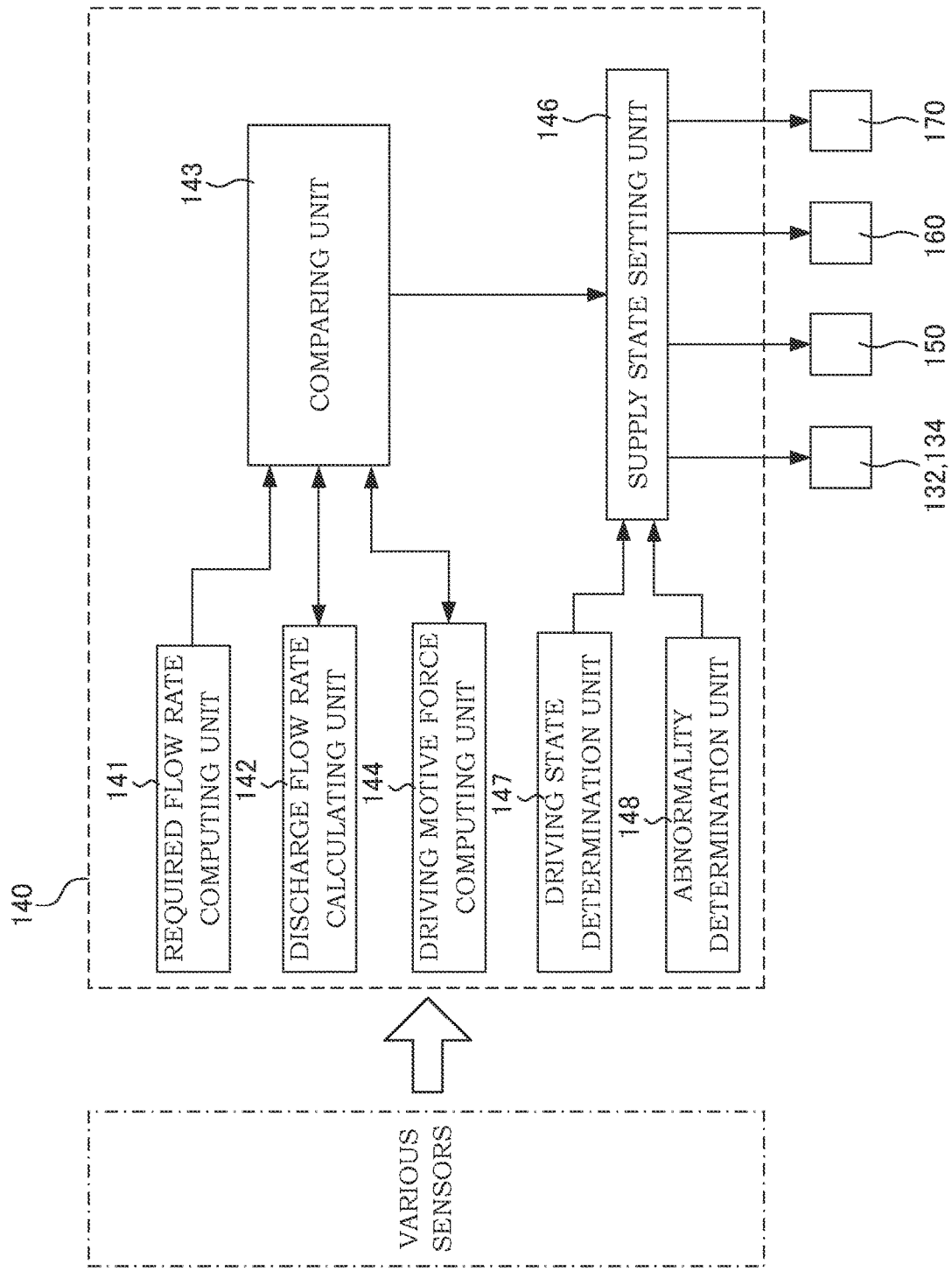
FIG. 7 is a block diagram for explaining the function of the controller of the working fluid supply device according to the third embodiment of the present invention.

FIG. 6 is a schematic view showing the configuration of the working fluid supply device 300 according to a third embodiment of the present invention. The working fluid supply device 300 is mounted on the vehicle (not shown) that is provided with an engine 150 serving as the first driving source and an automatic transmission 170 serving as the motive force transmitting device that transmits the output from the engine 150 to the drive wheel. The working fluid supply device 300 controls the supply of the working fluid to the automatic transmission 170. In the following, a description will be given of a case in which the automatic transmission 170 is the transmission provided with the belt type continuously variable transmission (CVT), as an example.

The working fluid supply device 300 is provided with: a first oil pump 110 serving as the first pump that is capable of supplying the working oil serving as the working fluid to the automatic transmission 170 by being driven by the output from the engine 150; a second oil pump 111 serving as the second pump that is capable of supplying the working oil to the automatic transmission 170 by being driven, together with the first oil pump 110, by the output from the engine 150; a third oil pump 120 serving as the third pump that is capable of supplying the working oil to the automatic transmission 170 by being driven by the output from an electric motor 160 serving as the second driving source; a first unloading valve 132 serving as the first unloading mechanism that shifts the first oil pump 110 to the no-load operation state; a second unloading valve 134 serving as the second unloading mechanism that shifts the second oil pump 111 to the no-load operation state; and a controller 140 serving as the supply state control unit that controls the supply state of the working oil to the automatic transmission 170 by controlling the operations of the electric motor 160, the first unloading valve 132, and the second unloading valve 134.

The first oil pump 110 is the vane pump that is rotationally driven by the engine 150, and sucks the working oil reserved in a tank 130 through a first suction pipe 112 and discharges the working oil to the automatic transmission 170 through a first discharge pipe 113. The first discharge pipe 113 is provided with a first check valve 117 that only allows the flow of the working oil from the first oil pump 110 to the automatic transmission 170.

In addition, the first discharge pipe 113 is connected with a first unloading passage 131 through which the upstream side of the first check valve 117 and the tank 130 are communicated. The first unloading valve 132 capable of releasing and shutting off the first unloading passage 131 is provided on the first unloading passage 131.

The first unloading valve 132 is an electrically driven open/close valve and is controlled by the controller 140 so as to be opened/closed. When the first unloading valve 132 is closed, because the first unloading passage 131 is shut off, the working oil that has been discharged from the first oil pump 110 is supplied to the automatic transmission 170 through the first discharge pipe 113. On the other hand, when the first unloading valve 132 is opened, because the first unloading passage 131 is released, the working oil that has been discharged from the first oil pump 110 is discharged to the tank 130 through the first unloading passage 131 and returns to the suction side of the first oil pump 110.

In other words, when the first unloading valve 132 is opened, both of the suction side and the discharge side of the first oil pump 110 are in communication with the tank 130, and so, the pressure difference between the suction side and the discharge side of the first oil pump 110 becomes approximately zero. Thus, the first oil pump 110 is in the no-load operation state, in other words, the load for driving the first oil pump 110 is scarcely exerted to the engine 150.

By switching the opening and closing of the first unloading valve 132 as described above, it is possible to switch the first oil pump 110 between the under-load operation state and the no-load operation state. The first unloading valve 132 may open and close the first unloading passage 131 by being directly driven by the solenoid and may open and close the first unloading passage 131 by presence/absence of the pilot pressure acting on the valve body, and the first unloading valve 132 may take any configuration as long as the first unloading passage 131 can be opened and closed in response to the instruction from the controller 140.

Similarly to the first oil pump 110, the second oil pump 111 is the vane pump that is rotationally driven by the engine 150 and has larger discharge capacity than the first oil pump 110. Specifically, the discharge flow rate of the second oil pump 111 per revolution is set so as to be about 1.4 to 1.8 times, preferably 1.6 times that of the first oil pump 110.

The second oil pump 111 sucks the working oil reserved in the tank 130 through a second suction pipe 114 and discharges the working oil to the automatic transmission 170 through a second discharge pipe 115 that is connected to the first discharge pipe 113. The second discharge pipe 115 is provided with a second check valve 118 that only allows the flow of the working oil from the second oil pump 111 to the automatic transmission 170.

In addition, the second discharge pipe 115 is connected with a second unloading passage 133 through which the upstream side of the second check valve 118 and the tank 130 are communicated. The second unloading valve 134 capable of releasing and shutting off the second unloading passage 133 is provided on the second unloading passage 133.

Similarly to the first unloading valve 132, the second unloading valve 134 is an electrically driven open/close valve and is controlled by the controller 140 so as to be opened/closed. When the second unloading valve 134 is closed, because the second unloading passage 133 is shut off, the working oil that has been discharged from the second oil pump 111 is supplied to the automatic transmission 170 through the second discharge pipe 115. On the other hand, when the second unloading valve 134 is opened, because the second unloading passage 133 is released, the working oil that has been discharged from the second oil pump 111 is discharged to the tank 130 through the second unloading passage 133 and returns to the suction side of the second oil pump 111.

In other words, when the second unloading valve 134 is opened, both of the suction side and the discharge side of the second oil pump 111 are in communication with the tank 130, and so, the pressure difference between the suction side and the discharge side of the second oil pump 111 becomes approximately zero. Thus, the second oil pump 111 is in the no-load operation state, in other words, the load for driving the second oil pump 111 is scarcely exerted to the engine 150.

By switching the opening and closing of the second unloading valve 134 as described above, it is possible to switch the second oil pump 111 between the under-load operation state and the no-load operation state. Similarly to the first unloading valve 132, the second unloading valve 134 may open and close the second unloading passage 133 by being directly driven by the solenoid and may open and close the second unloading passage 133 by presence/absence of the pilot pressure acting on the valve body, and the second unloading valve 134 may take any configuration as long as the second unloading passage 133 can be opened and closed in response to the instruction from the controller 140.

The first oil pump 110 and the second oil pump 111 may be two vane pumps configured separately or may be configured with a single vane pump such as the balanced vane pump having the two suction regions and the two discharge regions.

The third oil pump 120 is the internal gear pump that is rotationally driven by the electric motor 160, and sucks the working oil reserved in the tank 130 through a third suction pipe 121, and discharges the working oil to the automatic transmission 170 through a third discharge pipe 122 that is connected to the first discharge pipe 113. The third discharge pipe 122 is provided with a third check valve 124 that only allows the flow of the working oil from the third oil pump 120 to the automatic transmission 170.

The rotation of the electric motor 160 driving the third oil pump 120 is controlled by the controller 140. Thus, it is possible to freely change the discharge flow rate of the third oil pump 120 by changing the rotation of the electric motor 160.

As described above, in the working fluid supply device 300, it is possible to supply the working oil to the automatic transmission 170 from three oil pumps, namely, the first oil pump 110, the second oil pump 111, and the third oil pump 120.

Next, the controller 140 will be described with reference to FIG. 7. FIG. 7 is a block diagram for explaining a function of the controller 140.

The controller 140 is formed of a microcomputer including a CPU (a central processing unit), a ROM (a read-only memory), a RAM (a random-access memory), and an I/O interface (an input/output interface). The RAM stores data for processing executed by the CPU, the ROM pre-stores a control program, etc. for the CPU, and the I/O interface is used for input/output of information to/from a device connected to the controller 140. The controller 140 may also be formed of a plurality of microcomputers.

The controller 140 controls the supply of the working oil to the automatic transmission 170 by controlling, the electric motor 160, the first unloading valve 132, and the second unloading valve 134 on the basis of the signals indicating the state of the vehicle that are input from the various sensors provided at the various parts in the vehicle. The controller 140 may be configured so as to serve both as a controller of the engine 150 and a controller of the automatic transmission 170 or it may be provided separately from the controller of the engine 150 and the controller of the automatic transmission 170.

The signals indicating the state of the vehicle to be input to the controller 140 includes: for example the signals indicating the speed of the vehicle; the signals indicating acceleration of the vehicle; the signals indicating the operating position of the shift lever; the signals indicating the operated amount of the accelerator; the signals indicating the rotation speed of the engine 150; the signals indicating the load of the engine 150 such as the throttle position, the fuel-injection amount, and so forth; the signals indicating the input shaft and output shaft rotation speed of the automatic transmission 170; the signals indicating the temperature of the working oil in the automatic transmission 170; the signals indicating the pressure of the working oil (the line pressure) supplied to the automatic transmission 170; the signals indicating the transmission gear ratio of the automatic transmission 170; the signals indicating the discharge pressure of the first oil pump 110; the signals indicating the discharge pressure of the second oil pump 111; the signals indicating the discharge pressure of the third oil pump 120; the signals indicating the rotation speed of the electric motor 160; and so forth.

The controller 140 has, as the functions for controlling the supply of the working oil to the automatic transmission 170: a required flow rate computing unit 141 that computes the required flow rate Qr of the working oil required by the automatic transmission 170 on the basis of the signals that are input from the various sensors; a discharge flow rate calculating unit 142 that calculates the first discharge flow rate Q1 of the working oil discharged from the first oil pump 110 and the second discharge flow rate Q2 of the working oil discharged from the second oil pump 111 on the basis of the signals that are input from the various sensors; a driving motive force computing unit 144 that computes the first driving motive force W1 of the first oil pump 110, the second driving motive force W2 of the second oil pump 111, and the third driving motive force W3 of the third oil pump 120 on the basis of the signals that are input from the various sensors; a comparing unit 143 that performs comparison of the flow rate that has been computed by the required flow rate computing unit 141 with the flow rate that has been calculated by the discharge flow rate calculating unit 142 and comparison between the respective driving motive force that has been computed by the driving motive force computing unit 144; and a supply state setting unit 146 that sets the supply state of the working oil to the automatic transmission 170 on the basis of the comparison result obtained by the comparing unit 143. In the above, the required flow rate computing unit 141, etc. are shown as virtual units for the respective functions of the controller 140, and they do not imply that they physically exist.

The required flow rate computing unit 141 computes the flow rate of the working oil required by the automatic transmission 170 mainly on the basis of: the accelerator opening degree and the vehicle speed; the temperature of the working oil in the automatic transmission 170; the pressure of the working oil supplied to the automatic transmission 170; the input shaft and output shaft rotation speed of the automatic transmission 170; and the transmission gear ratio of the automatic transmission 170.

In the above, the flow rate of the working oil required by the automatic transmission 170 includes: a transmission flow rate required for changing a width between pulleys of a variator of a belt type continuously variable transmission (not shown); a leakage flow rate through a gap in a hydraulic control valve and a gap in hydraulic circuit; a lubrication flow rate required for cooling or lubrication of the automatic transmission 170; a cooling flow rate guided to an oil cooler (not shown); and so forth. The extent of these flow rates is mapped in advance and is stored in the ROM in the controller 140.

Specifically, the transmission flow rate takes a larger value when the transmission gear ratio is changed largely, for example, at the time of acceleration at which the rate of increase of the accelerator opening degree is large and at the time of deceleration at which the rate of deceleration of the vehicle speed is large, and therefore, the rate of change the accelerator opening degree and the vehicle speed are used as the parameters for the transmission flow rate. As the parameters related to the acceleration/deceleration of the vehicle, the throttle position, the fuel-injection amount, and so forth affecting the change in the rotation speed and the load of the engine 150 may also be used.

The lower the viscosity of the working oil becomes due to the increase in the temperature of the working oil and the higher the pressure of the working oil supplied becomes, the larger the value of the leakage flow rate becomes, and therefore, the temperature and pressure of the working oil are used as the parameters for the leakage flow rate.

In addition, the lower the viscosity of the working oil becomes due to the increase in the temperature of the working oil, the more likely an oil film shortage is to be caused, and therefore, the higher the temperature of the working oil is, the higher the lubrication flow rate needs to be set, and in addition, the higher the rotation speed of the rotation shaft in the automatic transmission 170 is, the more likely the oil film shortage is to be caused, and therefore, the higher the rotation speed of the rotation shaft in the automatic transmission 170 is, the higher the lubrication flow rate needs to be set. By taking these into consideration, the temperature of the working oil and the rotation speed of an input/output shaft of the automatic transmission 170 are used as the parameters for the lubrication flow rate, for example.

In addition, from the view point of the lubricity, the retention of the oil film, and so forth, the temperature of the working oil needs to be kept so as not to exceed a predetermined temperature, and in addition, in order to cool the working oil, it is required to achieve a state in which cooling air is guided to the oil cooler, in other words, a state in which the vehicle is traveling at a predetermined vehicle speed or higher. Therefore, for the cooling flow rate, the temperature of the working oil and the vehicle speed are mainly used as the parameters.

The parameters for determining the transmission flow rate, the leakage flow rate, the lubrication flow rate, and the cooling flow rate are only examples, and any parameters associated with the exemplified parameters may also be used, and so, selection of parameters is appropriately performed from with the signals input to the controller 140.

As described above, the required flow rate computing unit 141 mainly computes the required flow rate Qr that is an amount of the working oil required by the automatic transmission 170 per unit time by taking the transmission flow rate, the leakage flow rate, the lubrication flow rate, and the cooling flow rate into consideration.

The discharge flow rate calculating unit 142 calculates the first discharge flow rate Q1 that is the amount of the working oil discharged from the first oil pump 110 per unit time mainly on the basis of the rotation speed of the engine 150 and the preset first base discharged amount D1 that is the theoretical discharged amount per revolution of the first oil pump 110. The discharge flow rate calculating unit 142 also calculates the second discharge flow rate Q2 that is the amount of the working oil discharged from the second oil pump 111 per unit time mainly on the basis of the rotation speed of the engine 150 and the preset second base discharged amount D2 that is the theoretical discharged amount per revolution of the second oil pump 111.

The rotation speed of the first oil pump 110 and the first discharge flow rate Q1 of the first oil pump 110 are in a relationship in which they are changed substantially proportional to each other, and in addition, the first discharge flow rate Q1 of the first oil pump 110 is changed in response to the viscosity that varies with the oil temperature and the discharge pressure of the first oil pump 110. These relationships are mapped in advance in order to accurately calculate the first discharge flow rate Q1 of the first oil pump 110 and are stored in the ROM of the controller 140.

Because the rotation speed of the first oil pump 110 is changed in response to the rotation speed of the engine 150 driving the first oil pump 110, the discharge flow rate calculating unit 142 easily calculates the first discharge flow rate Q1 from the rotation speed of the engine 150, the temperature of the working oil, and the discharge pressure of the first oil pump 110. The calculation of the first discharge flow rate Q1 of the first oil pump 110 is performed regardless of the operated state of the first unloading valve 132, in other words, regardless of whether the first oil pump 110 is in the under-load operation state or the no-load operation state.

The first discharge flow rate Q1 may be calculated by using the rotation speed of the first oil pump 110 instead of the rotation speed of the engine 150. In addition, because the discharge pressure of the first oil pump 110 is changed in response to the line pressure PL that is the pressure of the working oil supplied to the automatic transmission 170, the line pressure PL may be used for the calculation of the first discharge flow rate Q1 of the first oil pump 110 instead of the discharge pressure of the first oil pump 110. For example, when the first oil pump 110 is in the no-load operation state, the discharge flow rate, which is estimated for a case in which the working oil is assumed to be discharged from the first oil pump 110 at a pressure corresponding to the line pressure PL, is calculated as the first discharge flow rate Q1.

The second discharge flow rate Q2 of the second oil pump 111 is also calculated in a similar manner to the first discharge flow rate Q1 of the first oil pump 110. The calculation of the second discharge flow rate Q2 of the second oil pump 111 is also performed regardless of the operated state of the first unloading valve 134, in other words, regardless of whether the second oil pump 111 is in the under-load operation state or the no-load operation state.

The driving motive force computing unit 144 computes the third driving motive force W3 of the third oil pump 120 for a case in which the discharge is performed at the target discharge flow rate Qa that is set on the basis of the first driving motive force W1 of the first oil pump 110, the second driving motive force W2 of the second oil pump 111, and the required flow rate Qr.

The first driving motive force W1 of the first oil pump 110 is the output expended to drive the first oil pump 110 in the engine 150 and is calculated from the first discharge flow rate Q1 of the first oil pump 110, the first discharge pressure P1, and the first pump mechanical efficiency η1. The first pump mechanical efficiency η1 that varies with the rotation speed of the first oil pump 110, the first discharge pressure P1, and the temperature of the working oil is mapped in advance and stored in the ROM of the controller 140. As the first discharge flow rate Q1, the value calculated by the discharge flow rate calculating unit 142 is used.

In addition, in a case in which the first oil pump 110 is in the no-load operation state and the working oil is not supplied from the first oil pump 110 to the automatic transmission 170, the first driving motive force W1 of the first oil pump 110 is estimated by assuming that the line pressure PL that is the pressure of the working oil in the automatic transmission 170 is the first discharge pressure P1.

The second driving motive force W2 of the second oil pump 111 is also calculated in a similar manner to the first driving motive force W1 of the first oil pump 110. The second pump mechanical efficiency $\eta 2$ that varies with the rotation speed of the second oil pump 111, the second discharge pressure P2, and the temperature of the working oil is mapped in advance and stored in the ROM of the controller 140. In a case in which the second oil pump 111 is in the no-load operation state and the working oil is not supplied from the second oil pump 111 to the automatic transmission 170, the second driving motive force W2 of the second oil pump 111 is estimated by assuming that the line pressure PL that is the pressure of the working oil in the automatic transmission 170 is the second discharge pressure P2.

Similarly, the third driving motive force W3 of the third oil pump 120 is calculated from the target discharge flow rate Qa that is the target amount of the working oil discharged per unit time from the third oil pump 120, the third discharge pressure P3, and the third pump mechanical efficiency $\eta 3$. The target discharge flow rate Qa is set so as to have different values for a case in which the working oil is supplied to the automatic transmission 170 only from the third oil pump 120 and for a case in which the working oil is supplied to the automatic transmission 170 from the third oil pump 120 together with the first oil pump 110 or the second oil pump 111.

Specifically, in a case in which the working oil is supplied to the automatic transmission 170 only from the third oil pump 120, it is preferable that the target discharge flow rate Qa be set to the flow rate that is higher than the required flow rate Qr by about 10%, for example, thereby allowing a margin such that the flow rate does not become lower than the required flow rate Qr even if the state of the vehicle at the present is varied by some extent.

On the other hand, in a case in which the working oil is supplied to the automatic transmission 170 not only from the third oil pump 120, but also from the first oil pump 110 or the second oil pump 111, the target discharge flow rate Qa is set on the basis of the deficient flow rate Qs that is obtained by subtracting the first discharge flow rate Q1 or the second discharge flow rate Q2 from the required flow rate Qr. In this case, it is preferable that the target discharge flow rate Qa be set to the flow rate that is higher than the deficient flow rate Qs by about 10%, for example, thereby allowing a margin such that the total flow rate of the target discharge flow rate Qa and the first discharge flow rate Q1 or the second discharge flow rate Q2 does not become lower than the required flow rate Qr even if the state of the vehicle at the present is varied by some extent.

In a case in which the electric motor 160 is stopped and the working oil is not supplied to the automatic transmission 170 from the third oil pump 120, the third driving motive force W3 of the third oil pump 120 is estimated by assuming that the line pressure PL that is the pressure of the working oil in the automatic transmission 170 is the third discharge pressure P3. Similarly to the first pump mechanical efficiency $\eta 1$ and the second pump mechanical efficiency $\eta 2$, the third pump mechanical efficiency $\eta 3$ that varies with the rotation speed of the third oil pump 120, the third discharge pressure P3, and the temperature of the working oil is mapped in advance and stored in the ROM of the controller 140.

Because the third driving motive force W3 of the third oil pump 120 corresponds to the electric power consumed by the electric motor 160 driving the third oil pump 120, the third driving motive force W3 of the third oil pump 120 may be calculated on the basis of the electric current and the voltage supplied to the electric motor 160.

In the above, the electric power generated by an alternator driven by the engine 150 is supplied to the electric motor 160 via a battery. Thus, in order to match the driving condition of the first oil pump 110 and the second oil pump 111 with the driving condition of the third oil pump 120, when the computation of the third driving motive force W3 of the third oil pump 120 is performed, various energy conversion efficiencies, such as the motor efficiency of the electric motor 160, the generation efficiency of the alternator, the charge/discharge efficiency of the battery, and so forth, are further taken into consideration. In other words, the finally computed third driving motive force W3 of the third oil pump 120 is the output consumed by the engine 150 when it is assumed that the third oil pump 120 is driven by the engine 150.

In addition, the driving motive force computing unit 144 computes a first total motive force D1 in a case in which the first oil pump 110 and the third oil pump 120 are driven at the same time, a second total motive force D2 in a case in which the second oil pump 111 and the third oil pump 120 are driven at the same time, and a third total motive force D3 in a case in which the first oil pump 110 and the second oil pump 111 are driven at the same time.

The first total motive force D1 is obtained by adding the first driving motive force W1 and the third driving motive force W3, the second total motive force D2 is obtained by adding the second driving motive force W2 and the third driving motive force W3, and the third total motive force D3 is obtained by adding the first driving motive force W1 and the second driving motive force W2.

The methods of computing the respective driving motive force W1, W2, and W3 and the respective total motive force D1, D2, and D3 are not limited to the computing method described above, and any sort of computing method may be used as long as it is possible to compute the respective driving motive force W1, W2, and W3 and the respective total motive force D1, D2, and D3 that is required when the driving conditions of the respective oil pumps 10, 11, and 20 are set to the same condition. In addition, in a case in which the respective discharge pressures P1, P2, and P3 are not directly detected, the respective driving motive force W1, W2, and W3 and the respective total motive force D1, D2, and D3 may be computed by assuming the line pressure PL as the respective discharge pressures P1, P2, and P3 regardless of which pump the working oil is supplied from.

As described below, the comparing unit 143 performs the comparison of the required flow rate Qr computed by the required flow rate computing unit 141 with the first discharge flow rate Q1 calculated by the discharge flow rate calculating unit 142 and the comparison of the total flow rate of the first discharge flow rate Q1 and the second discharge flow rate Q2 with the required flow rate Qr, and sends the signals corresponding to these comparison results to the driving motive force computing unit 144 and the supply state setting unit 146. In addition, as described above, the comparing unit 143 performs the comparison of the first driving motive force W1 computed by the driving motive force computing unit 144 with the third driving motive force W3 and the comparison of the first total motive force D1 with the second driving motive force W2 and the comparison of the second total motive force D2 with the third total motive force D3, and the comparing unit 143 sends the signals corresponding to these comparison results to the supply state setting unit 146.

The supply state setting unit 146 sets which pump is to be used to supply the working oil to the automatic transmission 170 by appropriately controlling the first unloading valve 132, the second unloading valve 134, the engine 150, the electric motor 160, and the automatic transmission 170 in accordance with the signals sent from the comparing unit 143, a driving state determination unit 147, which will be described below, and an abnormality determination unit 148. Specifically, when the vehicle is in a normal operation state, the supply state setting unit 146 sets the supply state of the working oil to the automatic transmission 170 to any one of following seven supply states.

The first supply state is a state in which the working oil is supplied to the automatic transmission 170 only from the first oil pump 110 by closing the second unloading valve 134 to shift the second oil pump 111 to the no-load operation state and by stopping the electric motor 160, the second supply state is a state in which the working oil is supplied to the automatic transmission 170 only from the third oil pump 120 by opening the first unloading valve 132 to shift the first oil pump 110 to the no-load operation state and by opening the second unloading valve 134 to shift the second oil pump 111 to the no-load operation state, the third supply state is a state in which the working oil is supplied to the automatic transmission 170 only from the second oil pump 111 by opening the first unloading valve 132 to shift the first oil pump 110 to the no-load operation state and by stopping the electric motor 160. As described above, the first supply state, the second supply state, and the third supply state are states in which the working oil is supplied to the automatic transmission 170 from any one pump selected from the first oil pump 110, the second oil pump 111, and the third oil pump 120.

The fourth supply state is a state in which the working oil is supplied to the automatic transmission 170 from the first oil pump 110 and the third oil pump 120 by opening the second unloading valve 134 to shift the second oil pump 111 to the no-load operation state, the fifth supply state is a state in which the working oil is supplied to the automatic transmission 170 from the second oil pump 111 and the third oil pump 120 by opening the first unloading valve 132 to shift the first oil pump 110 to the no-load operation state, and a sixth supply state is a state in which the working oil is supplied to the automatic transmission 170 from the first oil pump 110 and the second oil pump 111 by stopping the electric motor 160. As described above, the fourth supply state, the fifth supply state, and the sixth supply state are states in which the working oil is supplied to the automatic transmission 170 from any two pumps selected from the first oil pump 110, the second oil pump 111, and the third oil pump 120.

Finally, a seventh supply state is a state in which the working oil is supplied to the automatic transmission 170 from three of the first oil pump 110, the second oil pump 111, and the third oil pump 120.

Which supply states are set under what conditions by the supply state setting unit 146 will be described in detail in the following description of the supply control of the working oil to the automatic transmission 170.

In addition to the above-described functions, the controller 140 has the driving state determination unit 147 that determines a driving state of the engine 150 on the basis of the signals that are input from the various sensors and the abnormality determination unit 148 that determines presence/absence of an abnormality in the first oil pump 110, the second oil pump 111, and the third oil pump 120 on the basis of the signals that are input from the various sensors.

The driving state determination unit 147 determines which driving states the engine 150 is in, especially, whether the engine 150 is being stopped or being driven, mainly on the basis of the rotation speed of the engine 150, the throttle position, the fuel-injection amount, and so forth. The determination result obtained by the driving state determination unit 147 is sent to the supply state setting unit 146 as the determination result signal.

When the supply state setting unit 146 receives the signal indicating that the engine 150 is in the stopped state from the driving state determination unit 147, the supply state setting unit 146 controls the electric motor 160 and sets the above-described supply state to the during-stop supply state in which the working oil can be supplied from the third oil pump 120 to the automatic transmission 170. By doing so, even when the first oil pump 110 and the second oil pump 111 are not driven by the engine 150, as in during an anti-idling, it is possible to supply the working oil to the automatic transmission 170 by the third oil pump 120.

By diverting the third oil pump 120 as an auxiliary electric oil pump that is driven during the anti-idling as described above, there is no need to separately provide the auxiliary electric oil pump, and therefore, it is possible to reduce a production cost of the vehicle.

In a case in which the above-described supply state is set for the during-stop supply state, it is preferable that the first oil pump 110 be shifted to the no-load operation state by the first unloading valve 132 and that the second oil pump 111 be shifted to the no-load operation state by the second unloading valve 134. By shifting the first oil pump 110 and the second oil pump 111 to the no-load operation state as described above, because the driving motive force of the engine 150 for driving the first oil pump 110 and the second oil pump 111 becomes approximately zero when the engine 150 is restarted, it is possible to improve the restarting property of the engine 150.

The abnormality determination unit 148 determines presence/absence of the abnormality in the respective oil pumps 110, 111, and 120 mainly on the basis of: the line pressure PL that is the pressure of the working oil supplied to the automatic transmission 170, the first discharge pressure P1 of the first oil pump 110, the second discharge pressure P2 of the second oil pump 111, the third discharge pressure P3 of the third oil pump 120, the temperature of the working oil, and so forth.

For example, the abnormality determination unit 148 determines that there is an abnormality in the first oil pump 110 in a case in which the line pressure PL and the first discharge pressure P1 of the first oil pump 110 fall outside a predetermined range when the first oil pump 110 is driven. The abnormality determination unit 48 also determines presence/absence of the abnormality for the second oil pump 111 and the third oil pump 120 in a similar manner.

In addition, the abnormality determination unit 148 also determines that there is an abnormality in the third oil pump 120 in a case in which the temperature of the working oil is very low and is equal to or lower than −20 degree Celsius, for example, and if the third oil pump 120 is driven by the electric motor 160, there is a risk in that the electric motor 160 becomes overloaded due to the high viscosity of the working oil. When the temperature of the working oil is very low, an anti-idling control is prohibited, and a state in which the working oil is constantly supplied to the automatic transmission 170 at least from the first oil pump 110 is established.

In addition, because there is a risk in that the electric motor 160 cannot be normally driven, the abnormality determination unit 148 also determines that there is an abnormality in the third oil pump 120 in a case in which the state of charge of the battery for supplying the electric power to the electric motor 160 is insufficient and in which there is an abnormality in the alternator for charging the generated electric power to the battery.

When the supply state setting unit 146 receives the signals indicating that there is an abnormality in the first oil pump 110 or the second oil pump 111 from the abnormality determination unit 148, the supply state setting unit 146 sets the above-described supply state to the first abnormality-time supply state in which the working oil can be supplied to the automatic transmission 170 only from the third oil pump 120, and when the supply state setting unit 146 receives the signals indicating that there is an abnormality in the third oil pump 120 from the abnormality determination unit 148, the supply state setting unit 146 sets the above-described supply state to the second abnormality-time supply state at which the working oil can be supplied to the automatic transmission 170 from the first oil pump 110 and the second oil pump 111 by closing the first unloading valve 132 and the second unloading valve 134.

In addition, in the first abnormality-time supply state, the supply state setting unit 146 controls the electric motor 160 to increase the rotation speed of the electric motor 160 such that the discharge flow rate of the third oil pump 120 reaches the required flow rate Qr of the working oil that is required by the automatic transmission 170.

In addition, in the second abnormality-time supply state, when the total flow rate of the first discharge flow rate Q1 of the first oil pump 110 and the second discharge flow rate Q2 of the second oil pump 111 is lower than the required flow rate Qr of the working oil that is required by the automatic transmission 170, the supply state setting unit 146 controls the automatic transmission 170 such that the rotation speed of the engine 150 is increased by slightly changing the transmission gear ratio to the low side, and thereby, the rotation speeds of the first oil pump 110 and the second oil pump 111 are increased such that the total flow rate of the first discharge flow rate Q1 and the second discharge flow rate Q2 reaches the required flow rate Qr.

In the second abnormality-time supply state, when the total flow rate of the first discharge flow rate Q1 and the second discharge flow rate Q2 is equal to or higher than the required flow rate Qr of the working oil that is required by the automatic transmission 170, the supply state setting unit 146 only executes valve closing of the first unloading valve 132 and the second unloading valve 134 without performing the control of the engine 150 and the automatic transmission 170.

By doing so, even if there is an abnormality in the respective oil pumps 110, 111, and 120, the working oil can be supplied to the automatic transmission 170 sufficiently, and so, it is possible to operate the automatic transmission 170 stably.

If the rotation speed of the engine 150 for driving the first oil pump 110 and the second oil pump 111 reaches the maximum rated rotation speed or if the rotation speed of the electric motor 160 for driving the third oil pump 120 reaches the upper-limit rotation speed, then there is a risk in that the required flow rate Qr of the working oil that is required by the automatic transmission 170 cannot be ensured. In such a case, it may be possible to reduce the required flow rate Qr of the automatic transmission 170 by reducing the output torque from the engine 150 to reduce the required line pressure PL by controlling the engine 150.

Next, the supply control of the working oil to the automatic transmission 170 that is performed by the controller 140 having the above-described functions will be described with reference to a flow chart in FIG. 8. The control shown in FIG. 8 is executed repeatedly at predetermined time intervals by the controller 140.

First of all, in step S111, detection signals indicating the state of the vehicle, especially the states of the engine 150 and the automatic transmission 170, are input to the controller 140 from the various sensors.

In step S112, on the basis of the signals from the various sensors that are input in step S111, the required flow rate Qr of the working oil that is required by the automatic transmission 170 is computed by the required flow rate computing unit 141.

In following step S113, on the basis of the signals from the various sensors that are input in step S111, the first discharge flow rate Q1 of the working oil discharged from the first oil pump 110 and the second discharge flow rate Q2 of the working oil discharged from the second oil pump 111 are calculated by the discharge flow rate calculating unit 142.

The required flow rate Qr that is computed in step S112 and the first discharge flow rate Q1 that is calculated in step S113 are compared by the comparing unit 143 in step S114.

In step S114, when it is determined that the first discharge flow rate Q1 is equal to or higher than the required flow rate Qr, in other words, when it is possible to cover the required flow rate Qr of the working oil that is required by the automatic transmission 170 only by the first oil pump 110, the process proceeds to step S115.

In step S115, on the basis of the signals from the various sensors that are input in step S111, the first driving motive force W1 of the first oil pump 110 and the third driving motive force W3 of the third oil pump 120 are computed by the driving motive force computing unit 144. In this case, the target discharge flow rate Qa of the third oil pump 120 that is used for the computation of the third driving motive force W3 is the target discharge flow rate Qa that is set when the working oil is supplied to the automatic transmission 170 only from the third oil pump 120.

The first driving motive force W1 and the third driving motive force W3 that are computed by the driving motive force computing unit 144 are compared by the comparing unit 143 in step S116.

In the above, because the first oil pump 110 is driven by the engine 150, as the rotation speed of the engine 150 is increased, the discharge flow rate Q1 thereof is increased. On the other hand, although the required flow rate Qr of the working oil that is required by the automatic transmission 170 is increased when the transmission gear ratio is varied greatly, in other words, at the time of acceleration at which the rate of increase of the accelerator opening degree is large and at the time of deceleration at which the rate of deceleration of the vehicle speed is large, the required flow rate Qr becomes relatively low when the variation of the vehicle speed is small.

Thus, for example, when the rotation speed of the engine 150 is relatively high and the vehicle speed is relatively stable, the first discharge flow rate Q1 becomes higher than the required flow rate Qr and the amount of the fuel supplied to the automatic transmission 170 becomes excessive, and as a result, the output from the engine 150 may be wastefully consumed to drive the first oil pump 110.

When the required flow rate Qr is very low as described above, rather than supplying the working oil to the automatic transmission 170 from the first oil pump 110, there is a better possibility to suppress the fuel consumption in the engine 150 if the working oil is supplied from the third oil pump 120 by driving the electric motor 160.

Specifically, such a situation includes: a case in which the rotation of the engine 150 is at or higher than the medium rotation speed range in which the rotation speed is relatively high and the vehicle is at the cruising operation state in which the variation of the vehicle speed is small; a case in which the engine 150 is rotated at the high rotation speed range by the engine brake; and so forth. In addition, even in a case in which the rotation speed of the engine 150 is low, such as when the vehicle is stopped and the engine 150 is in the idling operation state or when the vehicle is travelling by the creeping at a very low speed, because the required flow rate Qr of the automatic transmission 170 becomes very low, the first discharge flow rate Q1 of the first oil pump 110 exceeds the required flow rate Qr, and the amount of the working oil supplied to the automatic transmission 170 may become excessive.

However, if the oil temperature is high even in such situations, because the leakage flow rate and the cooling flow rate are increased, the amount of the working oil supplied from the first oil pump 110 may not necessarily become excessive.

In other words, in step S116, in consideration of these factors, in order to cover the required flow rate Qr, it is determined in which of cases: a case in which the working oil is supplied from the first oil pump 110 that is driven by the engine 150; and a case in which the working oil is supplied from the third oil pump 120 that is driven by the electric motor 160, the fuel consumption of the engine 150 can consequently be better reduced.

In step S116, when it is determined that the first driving motive force W1 is equal to or smaller than the third driving motive force W3, in other words, when the fuel consumption of the engine 150 can be better reduced by supplying the working oil by driving the first oil pump 110 by the engine 150, the process proceeds to step S117, and the supply state of the working oil to the automatic transmission 170 is set to the first supply state by the supply state setting unit 146.

Specifically, such a situation includes: a case in which the vehicle is in the steady travelling time at which the sudden acceleration and the sudden deceleration are not performed and in which the rotation speed of the engine 150 is in the medium speed range and there is almost no increase/decrease in the transmission flow rate; a case in which, because the temperature of the working oil is at or lower than about 100° C., for example, the leakage flow rate is relatively low and the cooling flow rate is not required to be ensured; and so forth.

Therefore, it is possible to reduce the driving force of the first oil pump 110 by setting the preset first base discharged amount D1 that is the theoretical discharged amount of the first oil pump 110 per revolution to the minimum necessary value in accordance with the situation such as that described above in which the required flow rate Qr is relatively low and in which the frequency of use is relatively high when the vehicle is travelling. As the driving force of the first oil pump 110 is reduced as described above, the fuel consumption of the engine 150 driving the first oil pump 110 is reduced, and as a result, it is possible to improve the fuel efficiency of the vehicle.

On the other hand, in step S116, when it is determined that the first driving motive force W1 is larger than the third driving motive force W3, in other words, when the fuel consumption of the engine 150 can be better reduced by supplying the working oil by driving the third oil pump 120 by the electric motor 160, the process proceeds to step S118, and the supply state of the working oil to the automatic transmission 170 is set to the second supply state by the supply state setting unit 146.

Such a situation includes, as described above: a case in which the vehicle is in the cruising operation state in which the variation of the vehicle speed is small in a high speed range in which the rotation speed of the engine 150 is relatively high; a case in which the engine 150 is rotated at the high rotation speed range by the engine brake; a case in which the vehicle is stopped and the engine 150 is in the idling operation state; a case in which the vehicle is travelling at the very low speed by the creeping; and so forth.

On the other hand, in step S114, when it is determined that the first discharge flow rate Q1 is lower than the required flow rate Qr, in other words, when the required flow rate Qr of the working oil that is required by the automatic transmission 170 cannot be covered only by the first oil pump 110, the process proceeds to step S119.

In step S119, the required flow rate Qr that is computed in step S112 and the second discharge flow rate Q2 that is calculated in step S113 are compared by the comparing unit 143.

In step S119, when it is determined that the second discharge flow rate Q2 is equal to or higher than the required flow rate Qr, in other words, when the required flow rate Qr of the working oil required by the automatic transmission 170 can be covered only by the second oil pump 111, the process proceeds to step S120.

In step S120, on the basis of the signals from the various sensors that are input in step S111, the driving motive force computing unit 144 calculates the second driving motive force W2 of the second oil pump 111, and the first total motive force D1 when the first oil pump 110 and the third oil pump 120 are driven at the same time. The target discharge flow rate Qa of the third oil pump 120 that is used in the computation of the first total motive force D1 in this case is set on the basis of the deficient flow rate Qs that is obtained by subtracting the first discharge flow rate Q1 from the required flow rate Qr.

The second driving motive force W2 and the first total motive force D1 that are computed by the driving motive force computing unit 144 are compared by the comparing unit 143 in step S121.

In the above, when the required flow rate Qr is slightly higher than the first discharge flow rate Q1, if the second oil pump 111 having larger discharge capacity than the first oil pump 110 is driven, the amount of the fuel supplied to the automatic transmission 170 becomes excessive, and as a result, the output from the engine 150 will be wastefully consumed.

In such a case, rather than supplying the working oil to the automatic transmission 170 from the second oil pump 111, there is a better possibility to suppress the fuel consumption in the engine 150 if the working oil is supplied from the third oil pump 120 by driving the electric motor 160 in addition to the first oil pump 110.

In other words, in step S121, in order to cover the required flow rate Qr, it is determined in which of the cases: a case in which the working oil is supplied by driving the second oil pump 111 and a case in which the working oil is supplied by driving the first oil pump 110 and the third oil pump 120, the fuel consumption of the engine 150 can be better reduced.

In step S121, when it is determined that the second driving motive force W2 is equal to or lower than the first total motive force D1, in other words, when the fuel consumption of the engine 150 can be better reduced by supplying the working oil by driving the second oil pump 111 by the engine 150, the process proceeds to step S122, and the supply state of the working oil to the automatic transmission 170 is set to the third supply state by the supply state setting unit 146.

Such a situation includes, in contrast to the situation in which the supply state of the working oil to the automatic transmission 170 is set to the first supply state in step S117, a situation in which the required flow rate Qr approaches the second discharge flow rate Q2 of the second oil pump 111 such as a case in which the vehicle speed is changed slightly and the transmission flow rate is increased slightly, a case in which the temperature of the working oil is increased to about 120° C. and the leakage flow rate and the cooling flow rate are increased slightly, and so forth.

Therefore, it is possible to reduce the driving force of the second oil pump 111 by setting the preset second base discharged amount D2 that is the theoretical discharged amount of the second oil pump 111 per revolution to the value that is larger than the first base discharged amount D1 of the first oil pump 110 and that is to the minimum necessary value in accordance with the situation such as that described above in which the required flow rate Qr is low and in which the frequency of use is relatively high when the vehicle is travelling. As the driving force of the second oil pump 111 is reduced as described above, the fuel consumption of the engine 150 driving the second oil pump 111 is reduce, and as a result, it is possible to improve the fuel efficiency of the vehicle.

On the other hand, in step S121, when it is determined that the second driving motive force W2 is larger than the first total motive force D1, in other words, when the fuel consumption of the engine 150 can be better reduced by supplying the working oil by driving the first oil pump 110 by the engine 150 and by supplying the working oil by driving the third oil pump 120 by the electric motor 160, the process proceeds to step S123, and the supply state of the working oil to the automatic transmission 170 is set to the fourth supply state by the supply state setting unit 146.

Such a situation includes: a situation in which, due to presence of the variation in the vehicle speed, for example, the required flow rate Qr is higher than that in the situation in which the supply state of the working oil to the automatic transmission 170 is set to the first supply state in step S117; and a situation in which, due to the low temperature of the working oil, for example, the required flow rate Qr is lower than that in the situation in which the supply state of the working oil to the automatic transmission 170 is set to the third supply state in step S122.

On the other hand, in step S119, when it is determined that the second discharge flow rate Q2 is lower than the required flow rate Qr, in other words, when the required flow rate Qr of the working oil required by the automatic transmission 170 cannot be covered only by the second oil pump 111, the process proceeds to step S124.

In step S124, the required flow rate Qr that is computed in step S112 is compared with the total flow rate of the first discharge flow rate Q1 and the second discharge flow rate Q2 that are calculated in step S113 by the comparing unit 143.

In step S124, when it is determined that the total flow rate of the first discharge flow rate Q1 and the second discharge flow rate Q2 is equal to or higher than the required flow rate Qr, in other words, when the required flow rate Qr of the working oil required by the automatic transmission 170 can be covered by the first oil pump 110 and the second oil pump 111, the process proceeds to step S125.

In step S125, on the basis of the signals from the various sensors that are input in step S111, the driving motive force computing unit 144 computes the second total motive force D2 in a case in which the second oil pump 111 and the third oil pump 120 are driven at the same time and the third total motive force D3 in a case in which the first oil pump 110 and the second oil pump 111 are driven at the same time. The target discharge flow rate Qa of the third oil pump 120 that is used in the computation of the second total motive force D2 in this case is set on the basis of the deficient flow rate Qs obtained by subtracting the second discharge flow rate Q2 from the required flow rate Qr.

The second total motive force D2 and the third total motive force D3 that are computed by the driving motive force computing unit 144 are compared by the comparing unit 143 in step S126.

In the above, in a case in which the required flow rate Qr is slightly higher than the second discharge flow rate Q2, if the first oil pump 110 is driven in addition to the second oil pump 111, the amount of the working oil supplied to the automatic transmission 170 becomes excessive, and as a result, the output from the engine 150 will be wastefully consumed.

In such a case, rather than supplying the working oil to the automatic transmission 170 from the first oil pump 110 in addition to the second oil pump 111, there is a better possibility to suppress the fuel consumption in the engine 150 if the working oil is supplied from the third oil pump 120 by driving the electric motor 160 in addition to the second oil pump 111.

In other words, in step S126, in order to cover the required flow rate Qr, it is determined in which of cases: a case in which the working oil is supplied by driving the first oil pump 110 and the second oil pump 111; and a case in which the working oil is supplied by driving the second oil pump 111 and the third oil pump 120, the fuel consumption of the engine 150 can be better reduced.

In step S126, when it is determined that the second total motive force D2 is equal to or smaller than the third total motive force D3, in other words, when the fuel consumption of the engine 150 can be better reduced by supplying the working oil by driving the second oil pump 111 by the engine 150 and by supplying the working oil by driving the third oil pump 120 by the electric motor 160, the process proceeds to step S127, and the supply state of the working oil to the automatic transmission 170 is set to the fifth supply state by the supply state setting unit 146.

On the other hand, in step S126, when it is determined that the second total motive force D2 is larger than the third total motive force D3, in other words, when the fuel consumption of the engine 150 can be better reduced by supplying the working oil by driving the second oil pump 111 by the engine 150 and by supplying the working oil by driving the first oil pump 110 by the engine 150, the process proceeds to step S128, and the supply state of the working oil to the automatic transmission 170 is set to the sixth supply state by the supply state setting unit 146.

In the above, although the required flow rate Qr of the working oil that is required by the automatic transmission 170 is relatively high in the travelling state with acceleration/deceleration, the amount of the required flow rate Qr varies depending on the degree of acceleration/deceleration. Thus, even in the travelling state with acceleration/deceleration, the supply state of the working oil to the automatic transmission 170 is set to the fifth supply state when, for example, the rate of change of the vehicle speed is equal to or lower than the predetermined value and the required flow rate Qr is relatively low, and the supply state is set to the sixth supply state when the rate of change of the vehicle speed is higher than the predetermined value and the required flow rate Qr is relatively high.

In addition, when the temperature of the working oil is low, because the viscosity of the working oil is increased, if the working oil is to be supplied by the third oil pump 120, the load exerted to the electric motor 160 is increased. Thus, the supply state of the working oil to the automatic transmission 170 is switched between the fifth supply state or the sixth supply state depending on the temperature of the working oil, for example.

As described above, the supply state of the working oil to the automatic transmission 170 is switched to an appropriate supply state in which the fuel consumption of the engine 150 can be reduced in the operation state in which the required flow rate Qr is relatively high. As a result, even at the time of travelling with acceleration/deceleration in which the required flow rate Qr is relatively increased, it is possible to improve the fuel efficiency of the vehicle.

On the other hand, in step S124, when it is determined that the total flow rate of the first discharge flow rate Q1 and the second discharge flow rate Q2 is lower than the required flow rate Qr, in other words, when the required flow rate Qr of the working oil required by the automatic transmission 170 cannot be covered by the first oil pump 110 and the second oil pump 111, the process proceeds to step S129.

In step S129, the supply state of the working oil to the automatic transmission 170 is set to the seventh supply state by the supply state setting unit 146. In this case, the required flow rate Qr of the working oil that is required by the automatic transmission 170 is relatively high, and in order to ensure the flow rate, the third oil pump 120 is driven in addition to the first oil pump 110 and the second oil pump 111.

Specifically, such a situation includes: a case in which the transmission flow rate is increased by the sudden acceleration and/or the sudden deceleration; a case in which the leakage flow rate is increased as the temperature of the working oil becomes a high temperature exceeding 130° C., for example; a case in which sufficient cooling flow rate needs to be ensured because the temperature of the working oil is high temperature and the vehicle speed is increased to the speed equal to or higher than medium speed (30 to 50 km/h); and so forth.

As described above, by appropriately switching the supply state of the working oil to the automatic transmission 170 on the basis of the state of the vehicle, the state of the engine 150 and the automatic transmission 170 in particular, the working oil is sufficiently supplied to the automatic transmission 170 and the wasteful consumption of the fuel in the engine 150 is suppressed. As a result, it is possible to stably operate the automatic transmission 170 and to improve the fuel efficiency of the vehicle.

If the supply state of the working oil to the automatic transmission 170 is switched frequently, the pressure of the working oil supplied to the automatic transmission 170 is varied and the control of the automatic transmission 170 may become unstable, and so, hysteresis may be set when the comparison is performed by the comparing unit 143 so as to suppress frequent switching of the supply state. In addition, if the amount of the working oil supplied to the automatic transmission 170 does not become lower than the required flow rate Qr after the setting has been done to any of supply states, the shift to other supply state may be prohibited for a predetermined period of time.

Figure 8:
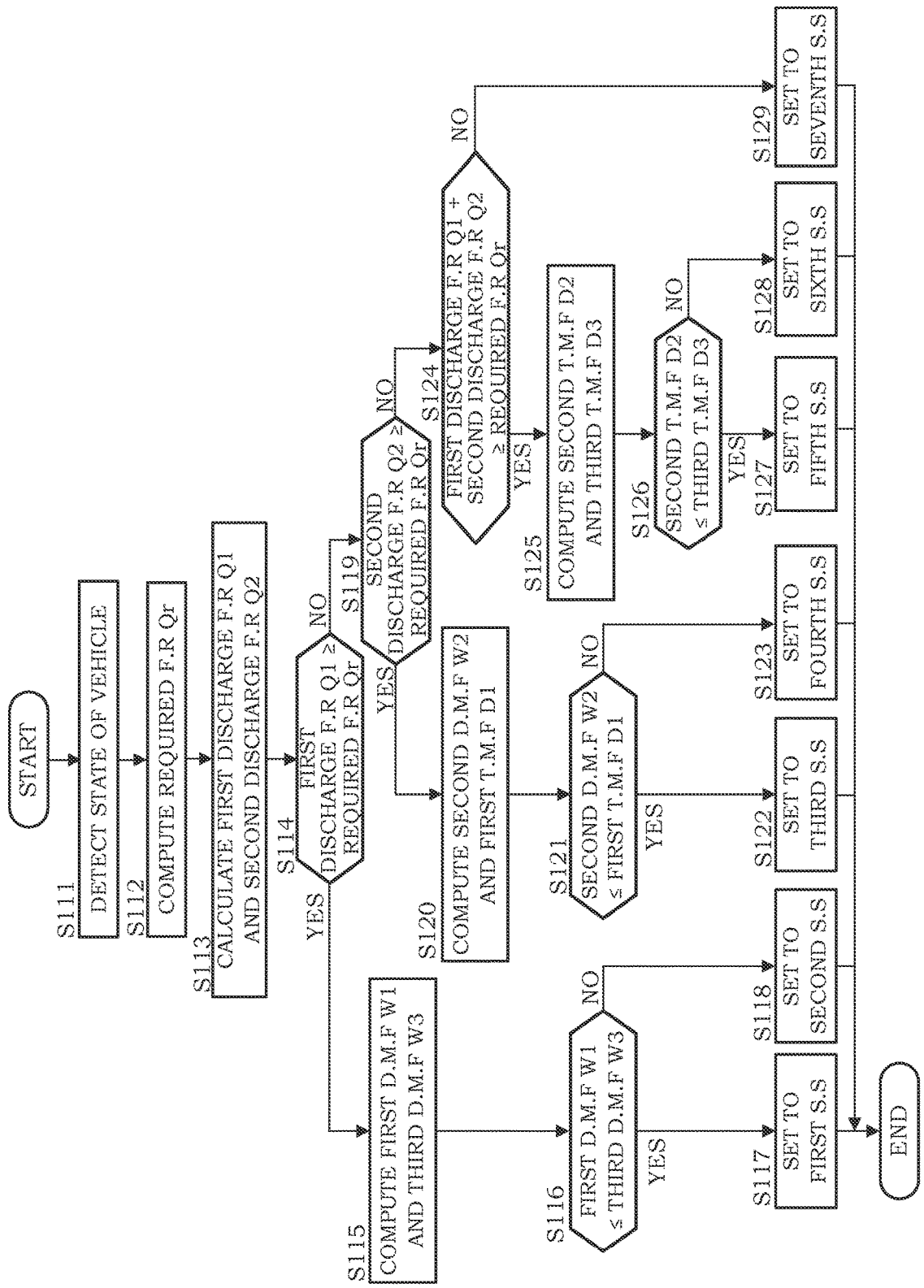
FIG. 8 is a flow chart showing the control procedure executed by the controller of the working fluid supply device according to the third embodiment of the present invention.

In addition, when the anti-idling control is performed in order to reduce the fuel consumption of the engine 150, if it is determined that the engine 150 is in the stopped state by the driving state determination unit 147, the supply state of the working oil to the automatic transmission 170 is set by the supply state setting unit 146 to the during-stop supply state in which the working oil is supplied to the automatic transmission 170 only from the third oil pump 120 without following the flow chart shown in FIG. 8.

By doing so, even when the engine 150 is stopped and the first oil pump 110 and the second oil pump 111 are not being driven, it is possible to stably supply the working oil to the automatic transmission 170 by the third oil pump 120. Because the required flow rate Qr of the working oil that is required by the automatic transmission 170 is very low when the anti-idling control is performed, it can be sufficiently covered by the third oil pump 120.

As described above, because the third oil pump 120 can be diverted as the auxiliary electric oil pump that is driven at the time of anti-idling, there is no need to provide separate auxiliary electric oil pump, and so, it is possible to reduce the production cost of the vehicle. For a case in which the vehicle is already provided with the auxiliary electric oil pump, by making the auxiliary electric oil pump to have the same function as that of the third oil pump 120, there will be no need to provide a new electric oil pump, and as a result, it is possible to reduce the production cost of the vehicle.

In addition, when it is determined by the abnormality determination unit 148 that there is an abnormality in the respective oil pumps 110, 111, and 120, the controller 140 sets the state in which the working oil is supplied to the automatic transmission 170 from the oil pump without abnormality without following the flow chart shown in FIG. 8.

Specifically, when the supply state setting unit 146 receives the signal indicating that there is an abnormality in the first oil pump 110 or the second oil pump 111 from the abnormality determination unit 148, the supply state setting unit 146 sets the supply state for supplying the working oil to the automatic transmission 170 to the first abnormality-time supply state in which the working oil is supplied only from the third oil pump 120, and the supply state setting unit 146 controls the electric motor 160 to increase the rotation speed of the electric motor 160 such that the discharge flow rate of the third oil pump 120 reaches the required flow rate Qr of the working oil that is required by the automatic transmission 170.

In addition, when the supply state setting unit 146 receives the signal indicating that there is an abnormality in the third oil pump 120 from the abnormality determination unit 148, the supply state setting unit 146 sets the supply state for supplying the working oil to the automatic transmission 170 to the second abnormality-time supply state in which the working oil is supplied from the first oil pump 110 and the second oil pump 111 by closing the first unloading valve 132 and the second unloading valve 134, and the supply state setting unit 146 controls the engine 150 and the automatic transmission 170 to increase the rotation speed of the engine 150 such that the total flow rate of the first discharge flow rate Q1 and the second discharge flow rate Q2 reaches the required flow rate Qr of the working oil required by the automatic transmission 170.

By doing so, even if there is an abnormality in the respective oil pumps 110, 111, and 120, it is possible to sufficiently supply the working oil to the automatic transmission 170 and to stably operate the automatic transmission 170.

According to the third embodiment described above, advantages shown below can be afforded.

In the working fluid supply device 300, on the basis of the required flow rate Qr, the discharge flow rate Q1, Q2, and the driving motive force W1, W2, and W3 that are computed on the basis of the state of the vehicle, the pump from which the working oil is to be supplied to the automatic transmission 170 is selected from three pumps with different discharged amounts, i.e., the first oil pump 110, the second oil pump 111 having larger discharge capacity than the first oil pump 110, and the third oil pump 120 driven by the electric motor 160.

As described above, by supplying the working oil to the automatic transmission 170 from the pump being capable of supplying the required flow rate Qr and having relatively small driving motive force W1, W2, and W3, it is possible to stably operate the automatic transmission 170 and to suppress wasteful consumption of energy by the engine 150. As a result, it is possible to improve the fuel efficiency of the vehicle.

In addition, in the working fluid supply device 300, even in a case in which the required flow rate Qr is relatively high, the working oil can be supplied at the flow rate higher than the required flow rate Qr by appropriately combining the pumps, and therefore, it is possible to stably operate the automatic transmission 170. In addition, by combining the oil pumps supplying the working oil to the automatic transmission 170 such that the total of the driving motive force of the oil pumps becomes relatively small in the combination, it is possible to suppress the wasteful consumption of the fuel in the engine 150.

In addition, because the working oil is also supplied from the third oil pump 120, there is no need to set maximum discharge flow rate of the first oil pump 110 and the second oil pump 111 so as to correspond to the maximum required flow rate of the automatic transmission 170, and so, it is possible to set the maximum discharge flow rate of the first oil pump 110 and the second oil pump 111 so as to be small and to reduce the driving motive force of the first oil pump 110 and the second oil pump 111. As described above, as the driving motive force of the first oil pump 110 and the second oil pump 111 is reduced, the wasteful consumption of the fuel in the engine 150 that drives the first oil pump 110 and the second oil pump 111 is suppressed. As a result, it is possible to improve the fuel efficiency of the vehicle.

Next, a modification of the above-described third embodiment will be described.

In the above-described third embodiment, the first unloading valve 132 and the second unloading valve 134 are used as the unloading mechanism that shifts the first oil pump 110 and the second oil pump 111 to the no-load operation state. Instead of this configuration, the unloading mechanism may be the clutch that is provided at the linking portion that links the engine 150 with the respective oil pumps 110 and 111. In this case, by disengaging the clutch, the respective oil pumps 110 and 111 are not driven by the engine 150, and the discharged amount from the respective oil pumps 110 and 111 becomes zero. As described above, the no-load operation state also includes a case in which the oil pump that is normally driven by the engine 150 is shifted to the non-operated state, in other words, a state at which the load for driving the oil pump is scarcely exerted to the engine 150 is established, and thereby, the discharged amount from the oil pump becomes zero.

In addition, the variable displacement vane pump or the piston pump may be employed as the first oil pump 110 and the second oil pump 111, and the discharged amount from the first oil pump 110 and the second oil pump 111 may be caused to become zero by adjusting the eccentric amount of the cam ring or the stroke of the piston. In this case, the adjusting mechanism for adjusting the discharged amount from the variable displacement pump corresponds to the unloading mechanism, and the first oil pump 110 and the second oil pump 111 are shifted to the no-load operation state by controlling the adjusting mechanism such that the discharged amount from the first oil pump 110 and the second oil pump 111 becomes zero.

In addition, although a case in which the automatic transmission 170 is a transmission provided with the belt type continuously variable transmission (CVT) has been described in the above-described third embodiment, the automatic transmission 170 may be of any type as long as it is operated by utilizing the pressure of the working oil, and the automatic transmission 170 may be provided with the toroidal continuously variable transmission or the planetary gear mechanism.

In addition, in the above-described third embodiment, the first oil pump 110 and the second oil pump 111 are the vane pumps, and the third oil pump 120 is the internal gear pump. The types of these pumps may not necessarily be of different types, and the pumps having the same type may be used. For example, all pumps may be the vane pumps. In addition, the types of the pumps are not limited thereto, and for example, the pumps of any type may be used as long as they are displacement pumps such as external gear pumps and piston pumps. In addition, although the first oil pump 110 and the second oil pump 111 are of fixed displacement type, a pump of a variable displacement type may also be used.

In addition, in the above-described third embodiment, the first oil pump 110 and the second oil pump 111 are driven by the output from the engine 150. The first driving source driving the first oil pump 110 and the second oil pump 111 is not limited to the engine 150, and for example, the first driving source may be an electric motor that drives the drive wheel of the vehicle.

In addition, in the above-described third embodiment, the third oil pump 120 is driven by the output from the electric motor 160. The second driving source driving the third oil pump 120 is not limited to the electric motor 160, and for example, the second driving source may be the auxiliary engine that drives the auxiliary device, etc.

In addition, in the above-described third embodiment, although the various signals are listed as the signals indicating the state of the vehicle to be input to the controller 140, in a case in which the torque converter is provided in the automatic transmission 170, for example, the signals indicating the operated state and the engaged state of the torque converter may be input to the controller 140 additionally. In this case, the required flow rate Qr of the automatic transmission 170 may be computed or the switching of the supply state of the working oil to the automatic transmission 170 may be limited by taking the state of the torque converter into consideration. For example, when it is detected that the torque converter is in a semi-engaged state (a slip lock up state), the shifting of the working oil the supply state to other supply state may be prohibited. By doing so, it is possible to maintain the torque converter in a stable operated state. In addition, the signals indicating the operated amount and the operated speed of the brake may be input to the controller 140 as the signals indicating the deceleration state of the vehicle.

In addition, in the above-described third embodiment, in the discharge flow rate calculating unit 142 of the controller 140, the first discharge flow rate Q1 of the working oil discharged from the first oil pump 110 and the second discharge flow rate Q2 of the working oil discharged from the second oil pump 111 are calculated. Instead of this configuration, the actual discharge flow rate of the working oil discharged from the first oil pump 110 and the second oil pump 111 may be measured by a flow rate sensor, etc. directly.

The configurations, operations, and effects of the embodiments of the present invention will be collectively described below.

The working fluid supply device 100, 200 is provided with: the first oil pump 10 and the second oil pump 11 driven by the output from the engine 50, the first oil pump 10 and the second oil pump 11 being capable of supplying the working oil to the automatic transmission 70; the third oil pump 20 driven by the output from the electric motor 60, the third oil pump 20 being capable of supplying the working oil to the automatic transmission 70; the first unloading valve 16 configured to shift the second oil pump 11 to the no-load operation state; and the controller 40 configured to control the supply state of the working oil to the automatic transmission 70 in accordance with the state of the vehicle, wherein the controller 40 is configured to set the supply state of the working oil to the automatic transmission 70, on the basis of the state of the vehicle, to the supply state selected from: the first supply state in which the second oil pump 11 is shifted to the no-load operation state by the first unloading valve 16, the third oil pump 20 is stopped, and the working oil is supplied to the automatic transmission 70 only from the first oil pump 10; the second supply state in which the second oil pump 11 is shifted to the no-load operation state by the first unloading valve 16 and the working oil is supplied to the automatic transmission 70 from the first oil pump 10 and the third oil pump 20; the third supply state in which the third oil pump 20 is stopped and the working oil is supplied to the automatic transmission 70 from the first oil pump 10 and the second oil pump 11; and the fourth supply state in which the working oil is supplied to the automatic transmission 70 from the first oil pump 10, the second oil pump 11, and the third oil pump 20.

In this configuration, it is possible to shift the second oil pump 11 among the first oil pump 10 and the second oil pump 11 driven by the output from the engine 50 driving the drive wheel of the vehicle to the no-load operation state by the first unloading valve 16. Thus, when it is not necessary to drive the two oil pumps 10 and 11, wasteful consumption of the fuel by the engine 50 is suppressed by shifting the second oil pump 11 to the no-load operation state.

In addition, in this configuration, it is possible to supply the working oil to the automatic transmission 70 also from the third oil pump 20 that is driven by the electric motor 60 in addition to the first oil pump 10 and the second oil pump 11. Thus, even when the required flow rate Qr is relatively high, by a combination of oil pumps for supplying the working oil to the automatic transmission 70 is selected such that the total of the driving motive force of the oil pumps becomes relatively small, it is possible to suppress the wasteful consumption of the fuel in the engine 50.

In addition, the controller 40 is configured to: compute the required flow rate Qr of the working oil that is required by the automatic transmission 70 on the basis of the state of the vehicle; the first discharge flow rate Q1 of the working oil discharged from the first oil pump 10 and the second discharge flow rate Q2 of the working oil discharged from the second oil pump 11; and set the supply state of the working oil to the automatic transmission 70 on the basis of a result obtained by comparing the first discharge flow rate Q1 with the required flow rate Qr and a result obtained by comparing the total flow rate of the first discharge flow rate Q1 and the second discharge flow rate Q2 with the required flow rate Qr.

In this configuration, the supply state of the working oil to the automatic transmission 70 is set on the basis of the result obtained by comparing the first discharge flow rate Q1 with the required flow rate Qr and the result obtained by comparing the total flow rate of the first discharge flow rate Q1 and the second discharge flow rate Q2 with the required flow rate Qr. As described above, by setting the supply state of the working oil to the automatic transmission 70 by considering the required flow rate Qr of the automatic transmission 70, it is possible to stably operate the automatic transmission 70 and to suppress the wasteful consumption of the fuel in the engine 50, and as a result, it is possible to improve the fuel efficiency of the vehicle.

In addition, when the first discharge flow rate Q1 is equal to or higher than the required flow rate Qr, the controller 40 is configured to set the supply state of the working oil to the automatic transmission 70 to the first supply state.

In this configuration, when the first discharge flow rate Q1 is equal to or higher than the required flow rate Qr, the supply state of the working oil to the automatic transmission 70 is set to the first supply state in which the working oil is supplied only from the first oil pump 10. Thus, it is possible to set the first base discharged amount D1 of the first oil pump 10 to the minimum necessary value in accordance with the operating condition with relatively low required flow rate Qr. As described above, by making the first base discharged amount D1 of the first oil pump 10 as low as possible, the driving force of the first oil pump 10 is also reduced, and as a result, the fuel consumption of the engine 50 driving the first oil pump 10 is reduced, and it is possible to improve the fuel efficiency of the vehicle.

In addition: the controller 40 is configured to compute, when the first discharge flow rate Q1 is lower than the required flow rate Qr and the total flow rate of the first discharge flow rate Q1 and the second discharge flow rate Q2 is equal to or higher than the required flow rate Qr, the first driving motive force W1 of the first oil pump 10, the second driving motive force W2 of the second oil pump 11; and the third driving motive force W3 of the third oil pump 20 in a case in which the target discharge flow rate Qa that is set on the basis of the required flow rate Qr is discharged; when the total motive force of the first driving motive force W1 of the first oil pump 10 and the third driving motive force W3 of the third oil pump 20 is equal to or smaller than the total motive force of the first driving motive force W1 of the first oil pump 10 and the second driving motive force W2 of the second oil pump 11, the supply state of the working oil to the automatic transmission 70 is set to the second supply state; and when the total motive force of the first driving motive force W1 of the first oil pump 10 and the third driving motive force W3 of the third oil pump 20 is larger than the total motive force of the first driving motive force W1 of the first oil pump 10 and the second driving motive force W2 of the second oil pump 11, the supply state of the working oil to the automatic transmission 70 is set to the third supply state.

In this configuration, when the total motive force of the first driving motive force W1 of the first oil pump 10 and the third driving motive force W3 of the third oil pump 20 is equal to or lower than the total motive force of the first driving motive force W1 of the first oil pump 10 and the second driving motive force W2 of the second oil pump 11, the supply state of the working oil to the automatic transmission 70 is set to the second supply state, and when the total motive force of the first driving motive force W1 of the first oil pump 10 and the third driving motive force W3 of the third oil pump 20 is larger than the total motive force of the first driving motive force W1 of the first oil pump 10 and the second driving motive force W2 of the second oil pump 11, the supply state of the working oil to the automatic transmission 70 is set to the third supply state. As described above, by combining the oil pumps supplying the working oil to the automatic transmission 70 such that the required flow rate Qr can be supplied and such that the total of the driving motive force of the pumps becomes relatively small in the combination, it is possible to stably operate the automatic transmission 70 and to improve the fuel efficiency of the vehicle.

In addition, the controller 40 is configured to set, when the total flow rate of the first discharge flow rate Q1 and the second discharge flow rate Q2 is lower than the required flow rate Qr, the supply state of the working oil to the automatic transmission 70 to the fourth supply state.

In this configuration, when the total flow rate of the first discharge flow rate Q1 and the second discharge flow rate Q2 is lower than the required flow rate Qr, the supply state of the working oil to the automatic transmission 70 is set to the fourth supply state. As described above, when the required flow rate Qr is large, in addition to the first oil pump 10 and the second oil pump 11, the working oil is also supplied from the third oil pump 20. Thus, because the maximum discharge flow rate of the first oil pump 10 and the second oil pump 11 need not be set in accordance with the maximum required flow rate of the automatic transmission 70, it is possible to set the maximum discharge flow rate of the first oil pump 10 and the second oil pump 11 small so as to reduce the driving motive force of the first oil pump 10 and the second oil pump 11. As the driving motive force of the first oil pump 10 and the second oil pump 11 is reduced as described above, the wasteful consumption of the fuel in the engine 50 driving the first oil pump 10 and the second oil pump 11 is suppressed. As a result, it is possible to improve the fuel efficiency of the vehicle.

In addition, the working fluid supply device 200 further includes the second unloading valve 34 configured to shift the first oil pump 10 and the second oil pump 11 to the no-load operation state, wherein: the controller 40 is configured to compute, when the first discharge flow rate Q1 is equal to or higher than the required flow rate Qr, the first driving motive force W1 of the first oil pump 10 and the third driving motive force W3 of the third oil pump 20 in a case in which the target discharge flow rate Qa that is set on the basis of the required flow rate Qr is discharged; when the first driving motive force W1 of the first oil pump 10 is equal to or lower than the third driving motive force W3 of the third oil pump 20, the supply state of the working oil to the automatic transmission 70 is set to the first supply state; and when the first driving motive force W1 of the first oil pump 10 is larger than the third driving motive force W3 of the third oil pump 20, the supply state of the working oil to the automatic transmission 70 is set to the fifth supply state in which the working oil is supplied to the automatic transmission 70 only from the third oil pump 20 by shifting the first oil pump 10 and the second oil pump 11 to the no-load operation state by the second unloading valve 34.

In this configuration, when the first driving motive force W1 of the first oil pump 10 is equal to or smaller than the third driving motive force W3 of the third oil pump 20, the supply state of the working oil to the automatic transmission 70 is set to the first supply state, and when the first driving motive force W1 of the first oil pump 10 is larger than the third driving motive force W3 of the third oil pump 20, the supply state of the working oil to the automatic transmission 70 is set to the fifth supply state. As described above, because the pump being capable of supplying the required flow rate Qr and having smaller driving motive force is selected as the pump that supplies the working oil to the automatic transmission 70, it is possible to stably operate the automatic transmission 70 and to improve the fuel efficiency of the vehicle.

In addition, the controller 40 determines the driving state of the engine 50 on the basis of the state of the vehicle, and when it is determined that the engine 50 is stopped, the controller 40 sets the supply state of the working oil to the automatic transmission 70 to the during-stop supply state in which the electric motor 60 is driven such that the working oil is supplied to the automatic transmission 70 from the third oil pump 20.

In this configuration, when it is determined that the engine 50 is stopped, the supply state of the working oil to the automatic transmission 70 is set to the during-stop supply state in which the working oil is supplied from the third oil pump 20 that is driven by the electric motor 60. By diverting the third oil pump 20 as the auxiliary electric oil pump that is driven during the anti-idling as described above, there is no need to separately provide the auxiliary electric oil pump, and therefore, it is possible to reduce the production cost of the vehicle.

In addition, the controller 40 determines whether or not an abnormality is present in the first oil pump 10, the second oil pump 11, and the third oil pump 20 on the basis of the state of the vehicle, and when it is determined that there is the abnormality in the first oil pump 10 or the second oil pump 11, the supply state of the working oil to the automatic transmission 70 is set to the first abnormality-time supply state in which the electric motor 60 is controlled such that a supply flow rate of the working oil supplied from the third oil pump 20 to the automatic transmission 70 exceeds the required flow rate Qr, and when it is determined that there is an abnormality in the third oil pump 20, the supply state of the working oil to the automatic transmission 70 is set to the second abnormality-time supply state in which the engine 50 and the automatic transmission 70 are controlled such that the supply flow rate of the working oil supplied from the first oil pump 10 and the second oil pump 11 to the automatic transmission 70 exceeds the required flow rate Qr.

In this configuration, when it is determined that there is an abnormality in the first oil pump 10 or the second oil pump 11, the supply state of the working oil to the automatic transmission 70 is set to the first abnormality-time supply state, and when it is determined that there is an abnormality in the third oil pump 20, the supply state of the working oil to the automatic transmission 70 is set to the second abnormality-time supply state. As described above, even in a case in which an abnormality is caused in the respective oil pump 10, 11, 20, the working oil is supplied to the automatic transmission 70 at the flow rate higher than the required flow rate Qr. Thus, it is possible to operate the automatic transmission 70 constantly and stably.

The working fluid supply device 300 is provided with: the first oil pump 110 driven by the output from the engine 150 and the first oil pump 110 being capable of supplying the working oil to the automatic transmission 170; the second oil pump 111 having larger discharge capacity than the first oil pump 110, the second oil pump 111 being driven by the output from the engine 150, and the second oil pump 111 being capable of supplying the working oil to the automatic transmission 170; the third oil pump 120 driven by the output from the electric motor 160, the third oil pump 120 being capable of supplying the working oil to the automatic transmission 170; the first unloading valve 132 configured to shift the first oil pump 110 to the no-load operation state; the second unloading valve 134 configured to shift the second oil pump 111 to the no-load operation state; and the controller 140 configured to control the supply state of the working oil to the automatic transmission 170 in accordance with the state of the vehicle, wherein: the controller 140 is configured to compute, on the basis of the state of the vehicle, the required flow rate Qr of the working oil required by the automatic transmission 170, the discharge flow rate Q1, Q2 of the first oil pump 110 and the second oil pump 111, and the driving motive force W1, W2, and W3 of the respective pumps 110, 111, 120; the controller 140 being configured to control the electric motor 160, the first unloading valve 132, and the second unloading valve 134 on the basis of the result of the computation; and the controller 140 being configured to cause the working oil to be supplied to the automatic transmission 170 from at least any one of the first oil pump 110, the second oil pump 111, and the third oil pump 120.

In this configuration, on the basis of the required flow rate Qr, the discharge flow rate Q1, Q2, and the driving motive force W1, W2, and W3 that are computed on the basis of the state of the vehicle, the pump from which the working oil is to be supplied to the automatic transmission 170 is selected from three pumps with different discharged amounts, i.e., the first oil pump 110, the second oil pump 111 having larger discharge capacity than the first oil pump 110, and the third oil pump 120 driven by the electric motor 160. As described above, by supplying the working oil to the automatic transmission 170 from the pump being capable of supplying the required flow rate Qr and having relatively small driving motive force W1, W2, and W3, it is possible to stably operate the automatic transmission 170 and to suppress wasteful consumption of energy by the engine 150.

In addition, in this configuration, even in a case in which the required flow rate Qr is relatively high, the working oil can be supplied at the flow rate higher than the required flow rate Qr by appropriately combining the pumps, and therefore, it is possible to stably operate the automatic transmission 170. In addition, by combining the oil pumps supplying the working oil to the automatic transmission 170 such that the total of the driving motive force of the oil pumps becomes relatively small in the combination, it is possible to suppress the wasteful consumption of the fuel in the engine 150. As a result, it is possible to improve the fuel efficiency of the vehicle.

In addition, the controller 140 is configured to compute the required flow rate Qr on the basis of the state of the vehicle and calculate the first discharge flow rate Q1 of the working oil discharged from the first oil pump 110 and the second discharge flow rate Q2 of the working oil discharged from the second oil pump 111, the controller 140 being configured to cause the working oil to be supplied to the automatic transmission 170 from at least any one of the first oil pump 110, the second oil pump 111, and the third oil pump 120 on the basis of: the result obtained by comparing the first discharge flow rate Q1 with the required flow rate Qr; the result obtained by comparing the second discharge flow rate Q2 with the required flow rate Qr; and the result obtained by comparing the total flow rate of the first discharge flow rate Q1 and the second discharge flow rate Q2 with the required flow rate Qr.

In this configuration, the supply state of the working oil to the automatic transmission 170 is set on the basis of the result obtained by comparing the first discharge flow rate Q1 with the required flow rate Qr, the result obtained by comparing the second discharge flow rate Q2 with the required flow rate Qr, and the result obtained by comparing the total flow rate of the first discharge flow rate Q1 and the second discharge flow rate Q2 with the required flow rate Qr. As described above, by appropriately selecting the pump supplying the working oil to the automatic transmission 170 from the three pumps by considering the required flow rate Qr of the automatic transmission 170, it is possible to stably operate the automatic transmission 170 and to suppress the wasteful consumption of the fuel in the engine 150, and as a result, it is possible to improve the fuel efficiency of the vehicle.

In addition, the controller 140 is configured to compute, when the first discharge flow rate Q1 is equal to or higher than the required flow rate Qr, the first driving motive force W1 in a case in which the working oil is supplied by driving the first oil pump 110 only and the third driving motive force W3 in a case in which the working oil is supplied by driving the third oil pump 120 only, the controller 140 being configured to cause, when the first driving motive force W1 is equal to or smaller than the third driving motive force W3, the working oil to be supplied only from the first oil pump 110 by shifting the second oil pump 111 to the no-load operation state by the second unloading valve 134 and by stopping the electric motor 160, and the controller 140 being configured to cause, when the first driving motive force W1 is larger than the third driving motive force W3, the working oil to be supplied only from the third oil pump 120 by shifting the first oil pump 110 to the no-load operation state by the first unloading valve 132 and by shifting the second oil pump 111 to the no-load operation state by the second unloading valve 134.

In this configuration, when the first driving motive force W1 is equal to or smaller than the third driving motive force W3, the working oil is supplied to the automatic transmission 170 only from the first oil pump 110, and when the first driving motive force W1 is larger than the third driving motive force W3, the working oil is supplied to the automatic transmission 170 only from the third oil pump 120. As described above, by selecting the pump being capable of supplying the required flow rate Qr and having small driving motive force as the pump for supplying the working oil to the automatic transmission 170, it is possible to stably operate the automatic transmission 170 and to improve the fuel efficiency of the vehicle.

In addition, in this configuration, it is possible to reduce the driving force of the first oil pump 110 by setting the first base discharged amount D1 of the first oil pump 110 to the minimum necessary value in accordance with a situation in which the required flow rate Qr is low and in which the frequency of use is relatively high when the vehicle is travelling. As the driving force of the first oil pump 110 is reduced as described above, the fuel consumption of the engine 150 driving the first oil pump 110 is reduced, and as a result, it is possible to improve the fuel efficiency of the vehicle when the first oil pump 110 is driven.

In addition, the controller 140 is configured to compute, when the first discharge flow rate Q1 is lower than the required flow rate Qr and when the second discharge flow rate Q2 is equal to or higher than the required flow rate Qr, the second driving motive force W2 in a case in which the working oil is supplied by driving the second oil pump 111 only and the first total motive force D1 in a case in which the working oil is supplied by driving the first oil pump 110 and the third oil pump 120, the controller 140 is configured to cause, when the second driving motive force W2 is equal to or smaller than the first total motive force D1, the working oil to be supplied only from the second oil pump 111 by shifting the first oil pump 110 to the no-load operation state by the first unloading valve 132 and by stopping the electric motor 160, and the controller 140 is configured to cause, when the second driving motive force W2 is larger than the first total motive force D1, the working oil to be supplied from the first oil pump 110 and the third oil pump 120 by shifting the second oil pump 111 to the no-load operation state by the second unloading valve 134.

In this configuration, when the second driving motive force W2 is equal to or smaller than the first total motive force D1, the working oil is supplied to the automatic transmission 170 only from the second oil pump 111, and when the second driving motive force W2 is larger than the first total motive force D1, the working oil is supplied to the automatic transmission 170 from the first oil pump 110 and the third oil pump 120. As described above, by selecting the pump being capable of supplying the required flow rate Qr and having small driving motive force as the pump for supplying the working oil to the automatic transmission 170, it is possible to stably operate the automatic transmission 170 and to improve the fuel efficiency of the vehicle.

In addition, in this configuration, it is possible to reduce the driving force of the second oil pump 111 on the basis of by setting the second base discharged amount D2 of the second oil pump 111 to the value that is larger than the first base discharged amount D1 of the first oil pump 110 and that is to the minimum necessary value in accordance with a situation in which the required flow rate Qr is low and in which the frequency of use is relatively high when the vehicle is travelling. As the driving force of the second oil pump 111 is reduced as described above, the fuel consumption of the engine 150 driving the second oil pump 111 is reduce, and as a result, it is possible to improve the fuel efficiency of the vehicle when the second oil pump 111 is driven.

In addition, the controller 140 is configured to compute, when the second discharge flow rate Q2 is lower than the required flow rate Qr and when the total flow rate of the first discharge flow rate Q1 and the second discharge flow rate Q2 is equal to or higher than the required flow rate Qr, the second total motive force D2 in a case in which the working oil is supplied by driving the second oil pump 111 and the third oil pump 120 and the third total motive force D3 in a case in which the working oil is supplied by driving the first oil pump 110 and the second oil pump 111, the controller 140 is configured to cause, when the second total motive force D2 is equal to or smaller than the third total motive force D3, the working oil to be supplied from the second oil pump 111 and the third oil pump 120 by shifting the first oil pump 110 to the no-load operation state by the first unloading valve 132, and the controller 140 is configured to cause, when the second total motive force D2 is larger than the third total motive force D3, the working oil to be supplied from the first oil pump 110 and the second oil pump 111 by stopping the electric motor 160.

In this configuration, when the second total motive force D2 is equal to or smaller than the third total motive force D3, the working oil is supplied to the automatic transmission 170 from the second oil pump 111 and the third oil pump 120, and when the second total motive force D2 is larger than the third total motive force D3, the working oil is supplied to the automatic transmission 170 from the first oil pump 110 and the second oil pump 111. As described above, by selecting the pump being capable of supplying the required flow rate Qr and having small driving motive force as the pump for supplying the working oil to the automatic transmission 170, it is possible to stably operate the automatic transmission 170 and to improve the fuel efficiency of the vehicle.

In addition, the controller 140 is configured to cause, when the total flow rate of the first discharge flow rate Q1 and the second discharge flow rate Q2 is lower than the required flow rate Qr, the working fluid to be supplied from the first oil pump 110, the second oil pump 111, and the third oil pump 120.

In this configuration, when the total flow rate of the first discharge flow rate Q1 and the second discharge flow rate Q2 is lower than the required flow rate Qr, the working oil is supplied to the automatic transmission 170 also from the third oil pump 120, in addition to the first oil pump 110 and the second oil pump 111. Thus, because the maximum discharge flow rate of the first oil pump 110 and the second oil pump 111 need not be set in accordance with the maximum required flow rate of the automatic transmission 170, it is possible to set the maximum discharge flow rate of the first oil pump 110 and the second oil pump 111 small so as to reduce the driving motive force of the first oil pump 110 and the second oil pump 111. As the driving motive force of the first oil pump 110 and the second oil pump 111 is reduced as described above, the wasteful consumption of the fuel in the engine 150 driving the first oil pump 110 and the second oil pump 111 is suppressed. As a result, it is possible to improve the fuel efficiency of the vehicle.

In addition, the controller 140 is configured to determine the driving state of the engine 150 on the basis of the state of the vehicle, and when it is determined that the engine 150 is stopped, the controller 140 causes the working oil to be supplied from the third oil pump 120.

In this configuration, when it is determined that the engine 150 is stopped, the working oil is supplied to the automatic transmission 170 from the third oil pump 120 that is driven by the electric motor 160. By diverting the third oil pump 120 as an auxiliary electric oil pump that is driven during the anti-idling as described above, there is no need to separately provide the auxiliary electric oil pump, and therefore, it is possible to reduce a production cost of the vehicle.

In addition, the controller 140 is configured to determine whether or not an abnormality is present in the first oil pump 110, the second oil pump 111, and the third oil pump 120 on the basis of the state of the vehicle, and when it is determined that there is an abnormality in the first oil pump 110 or the second oil pump 111, the controller 140 is configured to control the electric motor 160 such that the supply flow rate of the working oil supplied from the third oil pump 120 to the automatic transmission 170 exceeds the required flow rate Qr, and when it is determined that there is an abnormality in the third oil pump 120, the controller 140 is configured to control the engine 150 and the automatic transmission 170 such that the supply flow rate of the working oil supplied to the automatic transmission 170 from the first oil pump 110 and the second oil pump 111 exceeds the required flow rate Qr.

In this configuration, when it is determined that there is an abnormality in the first oil pump 110 or the second oil pump 111, the electric motor 160 is controlled such that the supply flow rate of the working oil supplied from the third oil pump 120 exceeds the required flow rate Qr, and when it is determined that there is an abnormality in the third oil pump 120, the engine 150 and the automatic transmission 170 are controlled such that the supply flow rate of the working oil supplied from the first oil pump 110 and the second oil pump 111 exceeds the required flow rate Qr. As described above, even in a case in which an abnormality is caused in the respective oil pump 110, 111, 120, the working oil is supplied to the automatic transmission 170 at the flow rate higher than the required flow rate Qr. Thus, it is possible to operate the automatic transmission 170 constantly and stably.

Embodiments of the present invention were described above, but the above embodiments are merely examples of applications of the present invention, and the technical scope of the present invention is not limited to the specific constitutions of the above embodiments.

In the working fluid supply device 100, 200, 300 according to the respective embodiments described above, although the working oil is used as the working fluid, a non-compressive fluid such as water, aqueous solution, and so forth may also be used instead of the working oil.

In addition, although the working fluid supply devices 100, 200, 300 according to the respective embodiments described above have been described as those for supplying the working fluid to the motive force transmitting device of the vehicle, the application of the working fluid supply device is not limited to the vehicle, and the working fluid supply device may be applied to any of those provided with a motive force transmitting device that is operated by the working fluid supplied from a pump.

This application claims priority based on Japanese Patent Application No. 2018-206459 and Japanese Patent Application No. 2018-206460 filed with the Japan Patent Office on Nov. 1, 2018, the entire contents of which are incorporated into this specification by reference.

The invention claimed is:

1. A working fluid supply device configured to control supply of working fluid to a motive force transmitting device, the motive force transmitting device being configured to transmit an output from a first driving source to a drive wheel of a vehicle, the working fluid supply device comprising:
   a first pump and a second pump driven by the output from the first driving source, the first pump and the second pump being capable of supplying working fluid to the motive force transmitting device;
   a third pump driven by an output from a second driving source, the third pump being capable of supplying working fluid to the motive force transmitting device;
   a first unloading mechanism configured to shift the second pump to a no-load operation state; and
   a supply state control unit configured to control a supply state of working fluid to the motive force transmitting device in accordance with a state of the vehicle, wherein
   the supply state control unit is configured to set the supply state of the working fluid to the motive force transmitting device, based on the state of the vehicle, to a supply state selected from: a first supply state in which the second pump is shifted to the no-load operation state by the first unloading mechanism, the third pump is stopped, and the working fluid is supplied to the motive force transmitting device only from the first pump; a second supply state in which the second pump is shifted to the no-load operation state by the first unloading mechanism and the working fluid is supplied to the motive force transmitting device from the first pump and the third pump; a third supply state in which the third pump is stopped and the working fluid is supplied to the motive force transmitting device from the first pump and the second pump; and a fourth supply state in which the working fluid is supplied to the motive force transmitting device from the first pump, the second pump, and the third pump.

2. The working fluid supply device according to claim 1, wherein
   the supply state control unit is configured to: compute a required flow rate of the working fluid that is required by the motive force transmitting device based on the state of the vehicle; calculate a first discharge flow rate of the working fluid that is discharged from the first pump and a second discharge flow rate of the working fluid that is discharged from the second pump; and set the supply state of the working fluid to the motive force transmitting device based on a result obtained by comparing the first discharge flow rate with the required flow rate and a result obtained by comparing a total flow rate of the first discharge flow rate and the second discharge flow rate with the required flow rate.

3. The working fluid supply device according to claim 2, wherein
   the supply state control unit is configured to set, when the first discharge flow rate is equal to or higher than the required flow rate, the supply state of the working fluid to the motive force transmitting device to the first supply state.

4. The working fluid supply device according to claim 2, wherein:
   the supply state control unit is configured to compute, when the first discharge flow rate is lower than the required flow rate and the total flow rate is equal to or higher than the required flow rate, a driving motive force of the first pump, a driving motive force of the second pump, and a driving motive force of the third pump in a case in which a target discharge flow rate that is set based on the required flow rate is discharged;
   when a total motive force of the driving motive force of the first pump and the driving motive force of the third pump is equal to or smaller than a total motive force of the driving motive force of the first pump and the driving motive force of the second pump, the supply state of the working fluid to the motive force transmitting device is set to the second supply state; and
   when the total motive force of the driving motive force of the first pump and the driving motive force of the third pump is larger than the total motive force of the driving motive force of the first pump and the driving motive force of the second pump, the supply state of the working fluid to the motive force transmitting device is set to the third supply state.

5. The working fluid supply device according to claim 2, wherein
   the supply state control unit is configured to set, when the total flow rate is lower than the required flow rate, the supply state of the working fluid to the motive force transmitting device to the fourth supply state.

6. The working fluid supply device according to claim 2, further comprising:
a second unloading mechanism configured to shift the first pump and the second pump to the no-load operation state, wherein:
the supply state control unit is configured to compute, when the first discharge flow rate is equal to or higher than the required flow rate, a driving motive force of the first pump and a driving motive force of the third pump in a case in which a target discharge flow rate that is set based on the required flow rate is discharged;
when the driving motive force of the first pump is equal to or smaller than the driving motive force of the third pump, the supply state of the working fluid to the motive force transmitting device is set to the first supply state; and
when the driving motive force of the first pump is larger than the driving motive force of the third pump, the supply state of the working fluid to the motive force transmitting device is set to a fifth supply state in which the working fluid is supplied to the motive force transmitting device only from the third pump by shifting the first pump and the second pump to the no-load operation state by the second unloading mechanism.

7. The working fluid supply device according to claim 2, wherein
the supply state control unit is configured to determine a driving state of the first driving source based on the state of the vehicle,
the supply state control unit is configured to set, when it is determined that the first driving source is stopped, the supply state of the working fluid to the motive force transmitting device to a during-stop supply state in which the second driving source is driven such that the working fluid is supplied to the motive force transmitting device from the third pump.

8. The working fluid supply device according to claim 2, wherein
the supply state control unit is configured to determine whether or not an abnormality is present in the first pump, the second pump, and the third pump based on the state of the vehicle,
the supply state control unit is configured to set, when it is determined that there is the abnormality in the first pump or the second pump, the supply state of the working fluid to the motive force transmitting device to a first abnormality-time supply state in which the second driving source is controlled such that a supply flow rate of the working fluid supplied from the third pump to the motive force transmitting device exceeds the required flow rate, and
the supply state control unit is configured to set, when it is determined that there is the abnormality in the third pump, the supply state of the working fluid to the motive force transmitting device to a second abnormality-time supply state in which the first driving source and the motive force transmitting device are controlled such that a supply flow rate of the working fluid supplied from the first pump and the second pump to the motive force transmitting device exceeds the required flow rate.

9. A working fluid supply device configured to control a supply of working fluid to a motive force transmitting device, the motive force transmitting device being configured to transmit an output from a first driving source to a drive wheel of a vehicle, the working fluid supply device comprising:
a first pump driven by the output from the first driving source, the first pump being capable of supplying the working fluid to the motive force transmitting device;
a second pump having larger discharge capacity than the first pump, the second pump being driven by the output from the first driving source, and the second pump being capable of supplying the working fluid to the motive force transmitting device;
a third pump driven by an output from a second driving source, the third pump being capable of supplying the working fluid to the motive force transmitting device;
a first unloading mechanism configured to shift the first pump to a no-load operation state;
a second unloading mechanism configured to shift the second pump to the no-load operation state; and
a supply state control unit configured to control a supply state of the working fluid to the motive force transmitting device in accordance with a state of the vehicle, wherein:
the supply state control unit is configured to compute, based on the state of the vehicle, a required flow rate of the working fluid that is required by the motive force transmitting device, a discharge flow rate of the first pump and the second pump, and driving motive force of the respective pumps; the supply state control unit being configured to control the second driving source, the first unloading mechanism, and the second unloading mechanism based on a result of the computation; and the supply state control unit being configured to cause the working fluid to be supplied to the motive force transmitting device from at least any one of the first pump, the second pump, and the third pump.

10. The working fluid supply device according to claim 9, wherein
the supply state control unit is configured to compute the required flow rate based on the state of the vehicle and to calculate a first discharge flow rate of the working fluid discharged from the first pump and a second discharge flow rate of the working fluid discharged from the second pump, the supply state control unit being configured to cause the working fluid to be supplied to the motive force transmitting device from at least any one of the first pump, the second pump, and the third pump based on: a result obtained by comparing the first discharge flow rate with the required flow rate; a result obtained by comparing the second discharge flow rate with the required flow rate; and a result obtained by comparing a total flow rate of the first discharge flow rate and the second discharge flow rate with the required flow rate.

11. The working fluid supply device according to claim 10, wherein
the supply state control unit is configured to compute, when the first discharge flow rate is equal to or higher than the required flow rate, a first driving motive force in a case in which the working fluid is supplied by driving the first pump only and a third driving motive force in a case in which the working fluid is supplied by driving the third pump only,
the supply state control unit is configured to cause, when the first driving motive force is equal to or smaller than the third driving motive force, the working fluid to be supplied only from the first pump by shifting the second pump to the no-load operation state by the second unloading mechanism and by stopping the second driving source, and the supply state control unit is configured to cause, when the first driving motive force is larger than the third driving motive force, the working fluid to be supplied only from the third pump by shifting the first pump to the no-load operation state by the first unloading mechanism and by shifting the second pump to the no-load operation state by the second unloading mechanism.

12. The working fluid supply device according to claim 10, wherein the supply state control unit is configured to compute, when the first discharge flow rate is lower than the required flow rate and when the second discharge flow rate is equal to or higher than the required flow rate, a second driving motive force in a case in which the working fluid is supplied by driving the second pump only and a first total motive force in a case in which the working fluid is supplied by driving the first pump and the third pump, the supply state control unit is configured to cause, when the second driving motive force is equal to or smaller than the first total motive force, the working fluid to be supplied only from the second pump by shifting the first pump to the no-load operation state by the first unloading mechanism and by stopping the second driving source, and the supply state control unit is configured to cause, when the second driving motive force is larger than the first total motive force, the working fluid to be supplied from the first pump and the third pump by shifting the second pump to the no-load operation state by the second unloading mechanism.

13. The working fluid supply device according to claim 10, wherein the supply state control unit is configured to compute, when the second discharge flow rate is lower than the required flow rate and when the total flow rate is equal to or higher than the required flow rate, a second total motive force in a case in which the working fluid is supplied by driving the second pump and the third pump and a third total motive force in a case in which the working fluid is supplied by driving the first pump and the second pump, the supply state control unit is configured to cause, when the second total motive force is equal to or smaller than the third total motive force, the working fluid to be supplied from the second pump and the third pump by shifting the first pump to the no-load operation state by the first unloading mechanism, and the supply state control unit is configured to cause, when the second total motive force is larger than the third total motive force, the working fluid to be supplied from the first pump and the second pump by stopping the second driving source.

14. The working fluid supply device according to claim 10, wherein the supply state control unit is configured to cause, when the total flow rate is lower than the required flow rate, the working fluid to be supplied from the first pump, the second pump, and the third pump.

15. The working fluid supply device according to claim 10, wherein the supply state control unit is configured to determine a driving state of the first driving source based on the state of the vehicle, and when it is determined that the first driving source is stopped, the supply state control unit is configured to cause the working fluid to be supplied from the third pump.

16. The working fluid supply device according to claim 10, wherein the supply state control unit is configured to determine whether or not an abnormality is present in the first pump, the second pump, and the third pump based on the state of the vehicle, when it is determined that there is the abnormality in the first pump or the second pump, the supply state control unit is configured to control the second driving source such that a supply flow rate of the working fluid supplied from the third pump to the motive force transmitting device exceeds the required flow rate, and when it is determined that there is the abnormality in the third pump, the supply state control unit is configured to control the first driving source and the motive force transmitting device such that a supply flow rate of the working fluid supplied from the first pump and the second pump to the motive force transmitting device exceeds the required flow rate.

* * * * *